United States Patent
Pisano et al.

[11] Patent Number: 6,091,573
[45] Date of Patent: Jul. 18, 2000

[54] DEPLOYABLE DRIVE FOR PROTRUDING ROTATABLE DATA STORAGE MEDIA

[76] Inventors: Jerry A. Pisano, 25292 Parthenon; Dennis Nelson, 25351 Parthenon, both of Mission Viejo, Calif. 92691

[21] Appl. No.: 08/786,682

[22] Filed: Jan. 21, 1997

Related U.S. Application Data

[63] Continuation-in-part of application No. 08/484,848, Jun. 7, 1995, abandoned.

[51] Int. Cl.[7] .............................. G11B 17/30; G11B 5/54
[52] U.S. Cl. ................. 360/99.09; 360/105; 369/77.1; 369/77.2; 369/270
[58] Field of Search ............................ 360/99.08, 97.01, 360/99.01, 99.02, 99.04, 99.05, 99.09, 99.12, 105; 369/36, 35, 34, 77.2, 270, 75.1, 77.1

[56] References Cited

U.S. PATENT DOCUMENTS

| | | | |
|---|---|---|---|
| 2,300,287 | 10/1942 | Huarisa | 369/76 |
| 2,475,744 | 7/1949 | Harman | 369/79 |
| 2,608,456 | 8/1952 | Barth | 369/75.2 |
| 4,399,528 | 8/1983 | Suzuki | 369/75.1 |
| 4,464,743 | 8/1984 | Takizawa et al. | 369/75.2 |
| 4,661,940 | 4/1987 | Camerik | 369/75.2 |
| 4,712,145 | 12/1987 | Naruki et al. | 360/96.5 |
| 5,130,959 | 7/1992 | Wakatsuki et al. | 369/35 |
| 5,156,195 | 10/1992 | Wehler et al. | 160/202 |
| 5,169,223 | 12/1992 | Suzuki et al. | 312/330.1 |
| 5,216,558 | 6/1993 | Griffith et al. | 360/99.06 |
| 5,301,176 | 4/1994 | Kawachi et al. | 369/75.2 |
| 5,481,420 | 1/1996 | Cardona et al. | 360/99.06 |
| 5,682,364 | 10/1997 | Ogawa | 369/34 |
| 5,812,511 | 9/1998 | Kawamura et al. | 369/77.2 |

FOREIGN PATENT DOCUMENTS

| | | |
|---|---|---|
| 858318 | 12/1952 | Germany . |
| 62-192992 | 8/1987 | Japan . |
| 62-209790 | 9/1987 | Japan . |
| 63-106980 | 5/1988 | Japan . |
| 1-3888 | 1/1989 | Japan . |
| 4-241273 | 8/1992 | Japan . |
| 08031147 | 2/1996 | Japan . |

OTHER PUBLICATIONS

A copy of International Search Report for PCT International Application No. PCT/US96/08725. Dated Sep. 5, 1996.
Copy of International Search Report re counterpart International Application No. PCT/US98/01160Dated Jul. 30, 1998.
Supplementary European Search Report for European Application No. 26 91 8039 Dated Jul. 1, 1998.

*Primary Examiner*—Craig A. Renner
*Attorney, Agent, or Firm*—Lyon & Lyon LLP

[57] ABSTRACT

A very compact drive and transducer system for removable rotational data storage media retains only a portion of the media in a housing from which drive and transducer mechanisms deploy. In the deployed position the media is held and rotated, while the transducer system is positioned at selected track locations. After usage is completed, the media is released or ejected and another can be inserted, or the deployable mechanisms can be returned to a packed configuration within the housing.

37 Claims, 17 Drawing Sheets

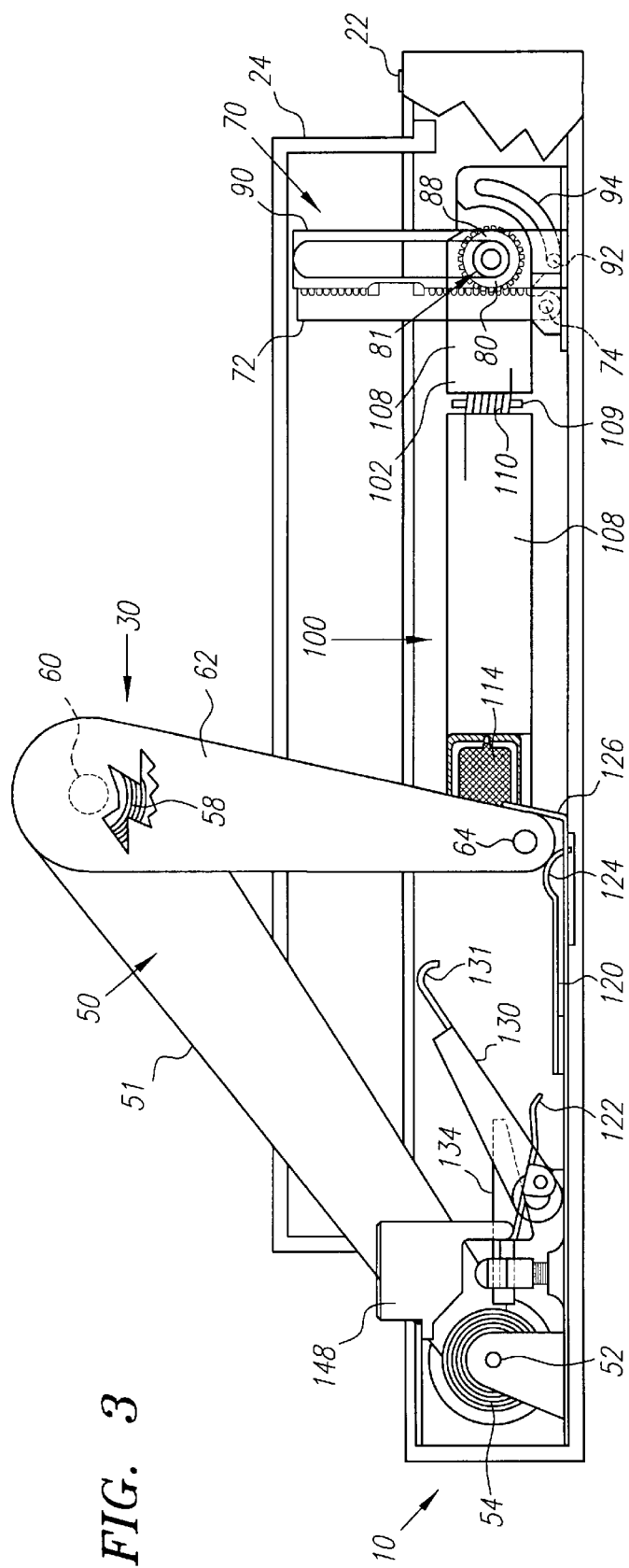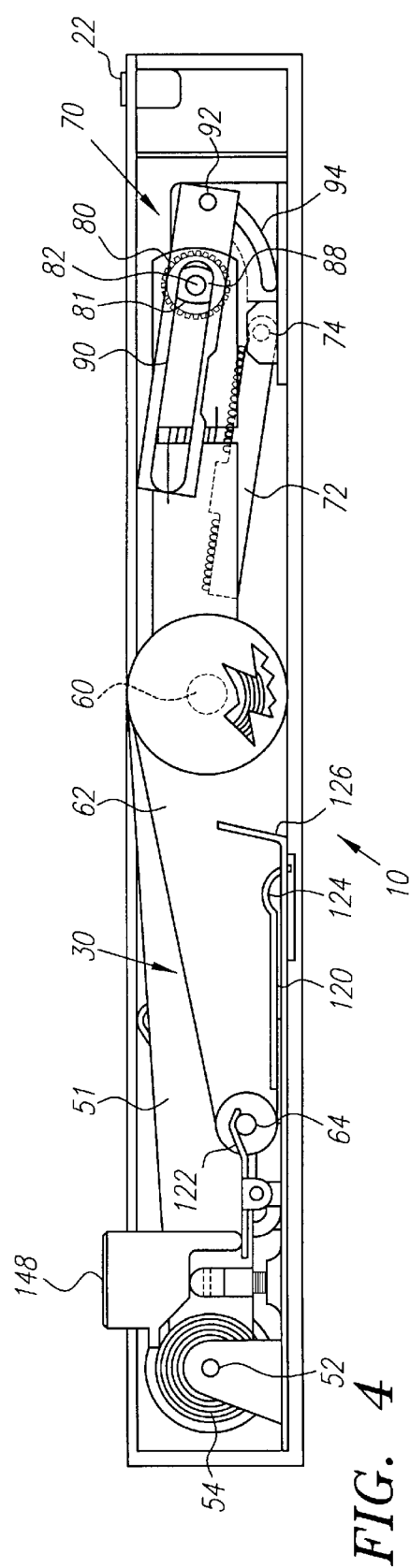

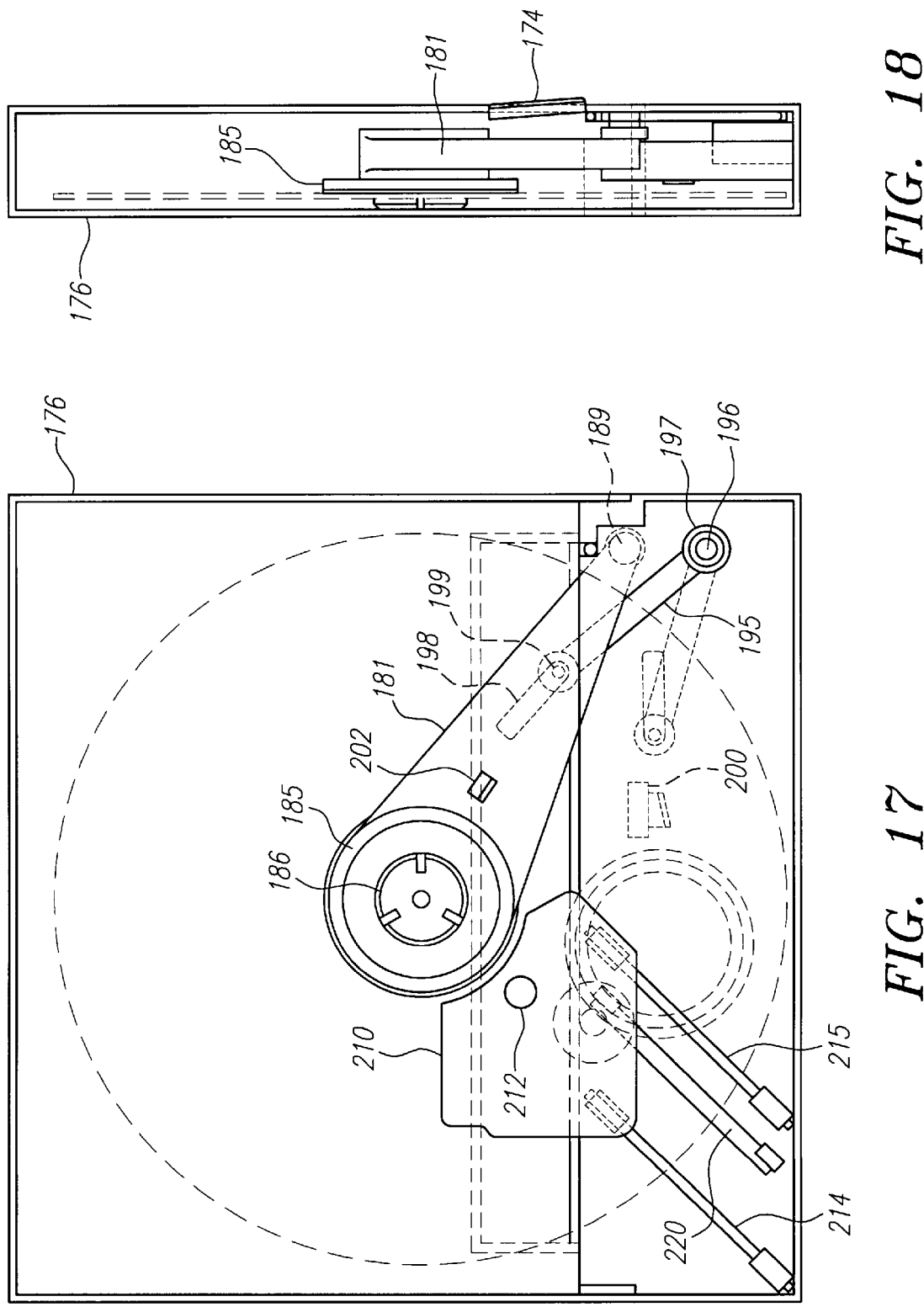

DEPLOYABLE DRIVE FOR PROTRUDING ROTATABLE DATA STORAGE MEDIA

RELATED APPLICATION

This application is a continuation-in-part of my previously filed application, Ser. No. 08/484,848, abandoned, filed Jun. 7, 1995.

FIELD OF THE INVENTION

This invention relates to computer peripheral devices for use with removable storage media, and more particularly to extremely compact versions of such devices.

BACKGROUND OF THE INVENTION

In the personal computer field, especially in lap tops and other portables, but also in desk units, space and weight are often of significant importance. Over the years, computer peripheral makers have constantly reduced the size of storage media and the devices with which they are used. A good example is in removable storage media such as floppy or flexible disk drives, where the media were originally 8" in diameter, then reduced to 5-¼", and subsequently reduced to 3-½", while the drives started as "full height" and then went to "half height" for a 5-¼" or 3-½" port. In desk top computers, 3-½" peripherals are often mounted on a 5-¼" half height port. In lap tops, notebooks and other portable computers, available space is at a particular premium, so that a different emphasis has been adopted, namely, approaching the objective of "just media size", in the drive unit. This means that the drive unit has the smallest feasible envelope around the full media. With the 3-½" floppy disk, the envelope is approximately 4"×4" to 4"×6", in depth and width, and the height (or thickness) is often ½" or less.

Since a lap top may only be 10" to 14" wide and 8" to 10" deep, however, it can be seen that a 4"×4" to 4"×6" envelope size demands use of a substantial internal volume within the lap top even if of low height. Reduction of this size requirement can be highly desirable, but a drastic reduction has not heretofore been achieved, except in terms of reducing profile height.

In modern recording systems, the tendency has been to try to secure higher capacity by increased record track density, increased recording density, or reduction of the overall size of the media as well as the drives with which they are used. However, media size is substantially invariant for a long time, once a standard size has been accepted by the industry and put widely into use. Thus software, documents and data are recorded and transferred on floppy disks now predominantly of the 3-½" standard, and no substantial changes are foreseen for the immediate future. Consequently, for the numerous data handling systems and devices on the market in which space is at a premium, a "smaller than media size" drive can be of great utility. As improvements in capability and reductions in size continue, this prospect will significantly increase.

Similar considerations apply to other removable storage media, such as CD-ROMS, Magneto-Optical (MO) and Bernoulli disks. Although different design factors exist, the volumetric improvement should be achievable in the same conceptual manner. For example, a higher density magnetic disk cartridge, known as the ZIP drive, is now being widely accepted because of its capacity and shorter access times, and while it is driven from a central hub, access to the two sides of the disk is gained through an access door in the inserted end. The cartridge is of approximately 4"×4" to a side, but only ¼" high, so that a separate or integral drive housing substantially larger in volume than the medium has heretofore been used.

SUMMARY OF THE INVENTION

Devices and methods in accordance with the present invention incorporate deployable driving and transducer units contained within a shallow drive system body or housing of a receiving dimension that is substantially less than one-half the media diameter. Only a part of the media is inserted in the housing, and to engage the media, the mechanisms are at least partially deployed or extended outwardly from the housing. The operative elements are then moved into engagement with the media, and the support, drive and transduction functions are carried out as required even though the principal part of the media protrudes outwardly from the unit. After use, the media is released and the mechanisms can be returned to the nested position.

In accordance with the invention, the rotatable media with which a transducer mechanism is to cooperate at different radial positions, is held such that its central drive axis is substantially spaced apart from the small volume within which the operative elements are compacted when in the nested position. The cooperative units which retain, drive and record or play back relative to the media are configured to nest within the enclosure without interference with each other, but to deploy outwardly from within the boundaries of the enclosure that is provided. The enclosure is of small height and shallow depth, but substantially the width of the media with which it is to cooperate. The media may be maintained in its operative position, with its drive axis spaced apart from the enclosure, by deployable elements which engage the media from one side at the central axis, or from opposite sides, or may engage the media along its side edges.

For a floppy disk drive, for example, a compact deployable unit is disposed in a small volume that is wider than the width of an inserted floppy disk cartridge and thicker than the media in the transverse dimension relative to the plane of the media. In depth, however the unit is only sufficiently large to receive the distal edge portion of the floppy media, in an accommodating slot. A deployable drive mechanism comprises a pair of spaced apart arms on opposite sides of the media, pivotally mounted in the housing. The arms deploy outwardly and are then closed together, to engage a drive chuck against a hub on the media so as to rotate the media about its center. A transducer positioning mechanism is also mounted in the housing and is deployable outwardly to place one or two transducers in cooperative relation to the media. The transducer control mechanism includes a positioning mechanism that operates after deployment to shift the transducer radially relative to the media. When the cartridge is inserted into the guide slot, the transducers are placed in operative relation for recording and/or reproduction. After use of a given cartridge it may be released and ejected, and the chuck mechanisms and transducer positioning device unloaded from the media. Thereafter, a new media may be inserted or the deployable mechanisms collapsed back to the packed condition.

With a 3-½" floppy disk drive, for example, the deployable mechanism includes a pair of pivotal arms disposed to cooperate as a chucking mechanism, for engaging the drive hub on the floppy disk cartridge. One arm has a drive chuck end, while the other pivotal arm has a backup surface at its free end, providing a base surface against which the chucking mechanism can operate. The deployable transducer mechanism comprises a base link extendible outwardly from within the housing, and includes a drive mechanism for controlled movement along the length of the base link. Transducer support mechanisms extending from the drive mechanism extend toward the access windows on opposite sides of the disk media cartridge. A spring mechanism in the housing opens the slider window when the cartridge is inserted. After insertion, and the engagement of the transducers to opposite sides of the floppy disks, radial positioning is effected by a positioning motor movable along the base link. An ejection mechanism associated with the inserted end of the disk media incorporates a releasable spring mechanism, separating the deployable mechanisms from each other and forcing the disk media upwardly in the housing slot.

Write protect and density control functions may be selected by switches in the unit, by separate sensors which engage conventional windows along the protruding edge of the disk media, or by repositioning these windows on the disk media itself.

Methods in accordance with the invention enable an only partially inserted disk media to be used in data interchange relation, by spaced apart mechanisms for receiving the disk media in a recording/reproduction position, which mechanisms are first deployed in spaced apart relation, then engage the inserted media, and thereafter operate in conventional fashion.

The system may incorporate deployable housing segments which extend outwardly when the mechanism is deployed, to protect operative elements from accidental engagement. The unit may be oriented so that the disk media is inserted horizontally, vertically, or in some other juxtaposition. Additionally, the unit may be configured as a self-contained separate structure, attachable to an available connector at a convenient surface on the parent unit with which it is to be associated. Where appropriate, as when optical sensors are used, means may be provided to isolate the transduction area from dust and other contaminants.

As a related or separate feature, a deployable cover may be secured about the periphery of the access side of the housing and pivot or fold and to encompass the inserted media, the drive and transducer units without interference. The cover, fabricated of thin but strong overlapping surfaces, forms an enclosure that prevents accidental engagement with the deployed structure. The limited volume it requires can be outside the enclosure as well as around its periphery.

In a device in accordance with the invention for use with CD-ROMs, a rotary arm having a terminal drive hub is deployable from a pivot axis adjacent one end of the enclosure, while a transducer mechanism is radially positionable relative to an installed CD-ROM along the radius of the CD-ROM but at an acute angle from a base near the opposite end of the enclosure. The side opening in the enclosure which is intercepted by the operative plane of the CD-ROM that is to be used can be covered by a hinged door that is opened to receive an attachable enclosure that encompasses the CD-ROM during operation, to protect against dust and inadvertent physical engagement.

In another example of a deployable system of smaller than media size in accordance with the invention, the configuration receives a high capacity removable media such as a "ZIP" cartridge containing an interior magnetic disk. Side guides within a shallow housing telescope directly outwardly to receive the cartridge between them. A transducer device which includes an interior radial positioner, and exterior read/write heads that fit through an end opening of the cartridge, is pivoted outwardly, into alignment with an access opening on the cartridge. A drive hub on one side of the cartridge, in a central region of the media, is engaged by a drive clutch mechanism that nests within the housing until deployment, but then moves out on a rotary arm mounted on one of the side guides into alignment with the central drive hub. The drive clutch, initially clear of the inserted cartridge, engages to the drive hub with a hinging motion so that an internal motor can rotate the disk in the cartridge. In operation, the read/write heads are positioned at chosen tracks on the disks within the cartridge after the chuck engages the hub to drive the disk. When the cartridge has been utilized for desired operations, it is ejected by a separate mechanism in the enclosure, and the side guides are renested in the housing, along with the transducer device and drive clutch mechanism.

BRIEF DESCRIPTION OF THE DRAWINGS

A better understanding of the invention may be had by reference to the following description, taken in conjunction with the accompanying drawings, in which:

FIG. 3 is a side sectional view of the system of FIGS. 1 and 2 showing the deployable chuck and drive mechanism and a deployable head positioning system in deployed position;

FIG. 4 is a side sectional view of the mechanism of FIGS. 1 and 2, showing the deployable elements in packed position;

FIG. 17 is a plan view of the mechanism of FIGS. 13 to 16, with the cover on but with the top wall removed, the CD-ROM being shown in phantom position, and with the drive chuck shown in the nested position, in phantom;

FIG. 18 is a side view corresponding to that of FIG. 17 but with the top wall of the cover included;

DETAILED DESCRIPTION OF THE INVENTION

A system in accordance with the invention is depicted in FIGS. 1–11 as employed for a floppy disk drive 10, as an example of a device for operating a removable media. Specifically referring to FIGS. 1 and 2, the media comprises a 3-½ inch floppy disk cartridge 12 having a relatively rigid housing confining an interior magnetic disk which is driven at a central hub on what will be called the hub or back side of the disk. The inserted or distal edge of the cartridge 12 includes a slidable window 14 that covers rectangular openings in the cartridge 12, so that when the window 14 is shifted to operating position, access can be had to areas of the opposite sides of the disk for recording and reproduction operations. The proximal end of the floppy disk cartridge 12 includes small windows 16 which are occluded or not occluded in accordance with write protect and density functions. In the prior art type of floppy disk drive, a fully inserted cartridge 12 places these small windows 16 in juxtaposition to sensors, but in the present example, this portion of the cartridge 12 protrudes and the write protect and density selection functions are exercised differently. However, the small windows 16 can as readily be mounted at the inserted end of the cartridge 12, for sensing by means internal to the drive 10. Inasmuch as the details of floppy disk drives are well understood and the essentials of this configuration do not form part of the invention, no further discussion is provided.

Figure 1:
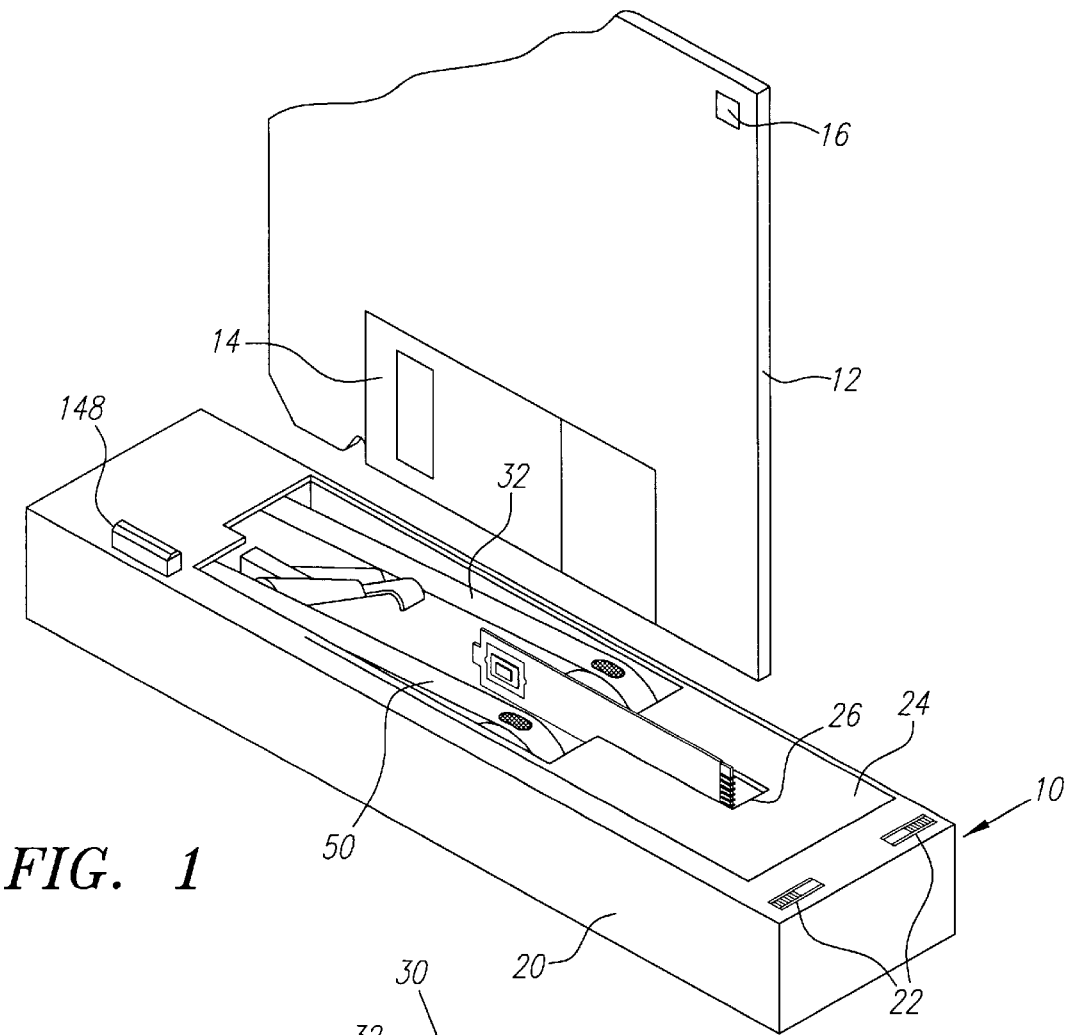
FIG. 1 is a combined perspective and exploded view of an ultra compact disk media drive system in the packed state, with a disk cartridge in position for entry.

As seen in the perspective view of FIG. 1, in which a cartridge 12 is shown as it is about to be inserted in a drive housing 20, the housing is a low profile rectangular unit of greater lateral dimension than the width of the cartridge 12. Although the housing 20 will often be mounted in or on the side of the computer unit to which it is to be attached, it is to be recognized that the mounting can be relatively arbitrary. The housing 20 can be mounted in a port in the computer housing, or attached to the exterior, or disposed in another orientation. For convenience, the housing 20 is depicted as disposed in an upstanding orientation, and the terms "top", "front", "rear", "side" and "bottom" are used for descriptive purposes only relative to that orientation shown. Since the dimensions, in plan, of the 3-½ inch floppy are about 3-½ inches by 3-⅝ inches, and the cartridge is approximately ⅛ inch thick, housings in accordance with the invention can be less than ¾ inches high by 5 inches long by 1-½inches deep. Consequently, provision can usually be made for incorporation of the unit in a small processor, whether it is to be embedded in the side or top of a lap top or notebook computer. Alternatively, with a surface mount, bayonet connectors (not shown) on the housing need only be fitted into suitable receptacles for connection of power and data transfer lines. Such arrangements enable a removable disk media capability to be added to a system without substantially affecting unit size. This does not preclude the option of packaging the electronics inside the drive as is done in the current state of the art.

Figure 2:
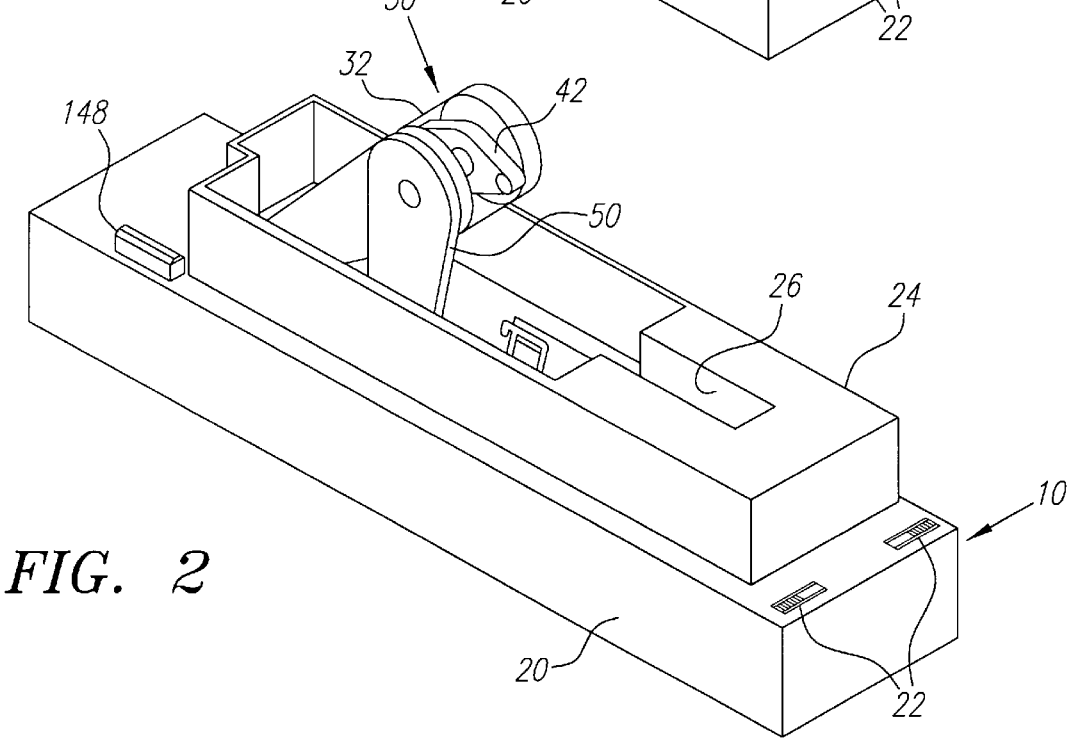
FIG. 2 is a perspective view of the drive system of FIG. 1 showing a deployable chuck and drive mechanism in extended position.

The housing 20 contains an internal pop-out or extendible frame 24 that has a limited upward travel and is deployed when a disk cartridge is inserted through a central lengthwise slot 26, as shown in somewhat simplified form in FIG. 2. Write protect and density switches 22 are provided at one side of the housing 20 for selection of write protect and density options. Alternatively, the write protect and density windows 16 on the disk cartridge 12 can be repositioned adjacent the leading (inserted) end and sensed by known mechanisms, or deployable sensors may be extended from the housing for this purpose.

Figure 10:
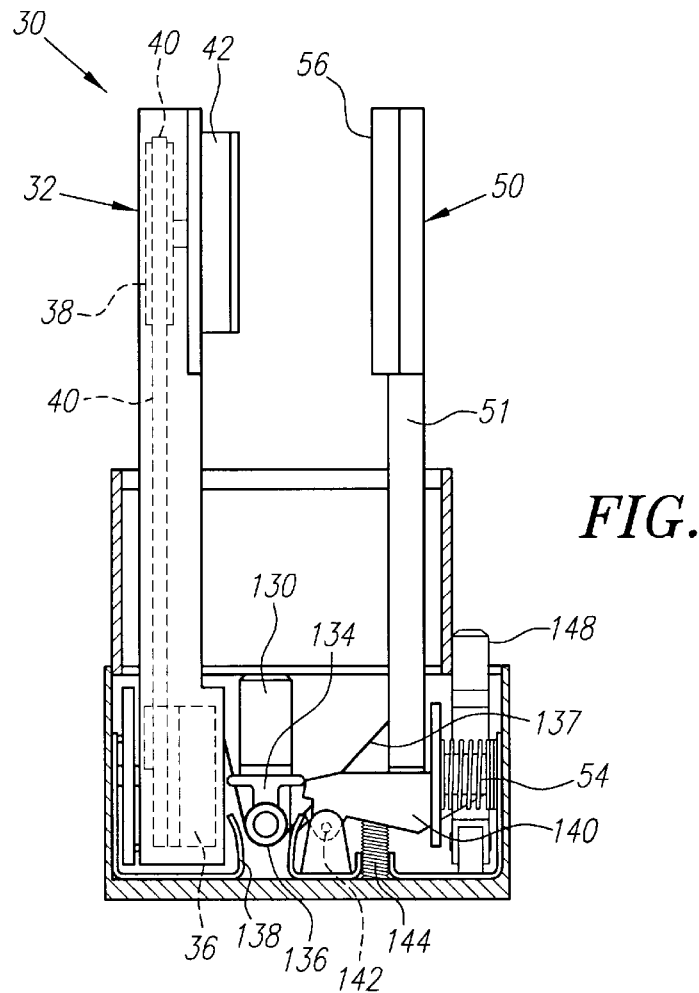
FIG. 10 is an end sectional view showing the deployable elements in deployed but not engaged position.
Figure 11:
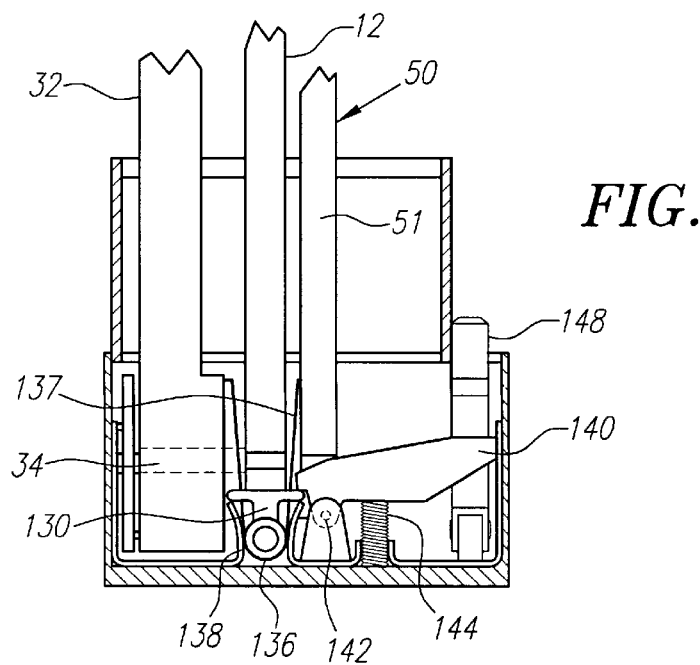
FIG. 11 is an end sectional view corresponding to FIG. 10 but with the deployable elements engaged to the cartridge.

As seen in FIGS. 3 to 6 additionally the deployable chuck and drive mechanism 30 comprises primarily a pair of spaced apart pivoted arms mechanically biased toward a deployed position but controlled by a toggle-type mechanism to have a collapse function. The first pivoted arm 32(FIGS. 2 and 6) includes a chuck mechanism disposed on the "hub" or back side of an inserted floppy disk, as also seen in FIGS. 10 and 11. The arm 32 is mounted to pivot within an arc about a base pivot shaft 34 (FIG. 11) disposed adjacent one longitudinal end of the housing 20. A motor 36 (FIG. 10) mounted at the base pivot drives a pulley 38 at the free or elbow end of the arm 32 via an interior belt 40 inside the arm 32. A drive chuck 42 at the free end is rotated by the pulley 38 and faces the hub of the cartridge to rotate the disk within.

Although a base mounted motor and belt drive have been shown by way of example, it will be apparent that other configurations may be used as well for the drive chuck, including a direct coupled motor.

The second deployable device 50 is disposed on the opposite side from the floppy disk hub, or on what may be called the front side of the disk. A longer first arm 51 is mounted to pivot about, and is slidable along, a base pivot shaft 52 that is collinear with and coupled to the base pivot shaft 34 at the opposite side, so that the arms 32, 51 move together. A helical clamping spring 54 (FIG. 5) around the shaft 52 urges the device 50 toward engagement with an inserted cartridge, but is restrained until such time as the cartridge is fully inserted so that there is adequate clearance for the sides of the cartridge. A clamp pad 56 at the elbow end of the first arm 51 is disposed opposite the drive chuck 42 when the mechanism is in the operative position, providing needed support for engagement and rotation of the hub on the floppy disk by the drive chuck 42. In the elbow region, an internal torsion spring 58 around an elbow pin 60 biases a control arm or strut 62 in the direction toward deployment, but its action is controlled by toggle action and limit catches as described below. For this purpose, a bar 64 extends outwardly, transverse to the plane of the inserted floppy disk, at the lower end of the control arm 62. It will be evident that the arms 32, 51 could be separately deployable and packable by using individual biasing springs and toggle devices.

Referring to FIGS. 3–5 and 7–9, a deployable head positioning mechanism 70 is mounted to extend from the opposite end of the housing 20 from the deployable chuck and drive mechanism 30. An extendible rack 72 pivots about a rack pivot arm 74 adjacent the bottom of the housing 20, up to a vertical position relative to the housing 20. A drive pinion 80 moves along the rack 72 to control the radial position of the magnetic heads relative to the disk, as described below. For compactness, the rack pinion 80 forms the exterior of a wound rotor 81, about a non-rotating shaft stator 82. It will occur to those skilled in the art that the drive may alternatively employ a compact motor positioned at one side of a one-piece pinion, or a split rack with separate pinions on opposite sides of a central motor, or a base mounted motor with a band drive. End members 84, 85 at each side are coupled to the shaft 82 and are similarly non-rotatable, providing supports for the base of a dual-sided magnetic head assembly as described hereafter. At each end of the shaft 82, follower hubs 88 rest in and move between guide rails 90 for the pinion 80. The guide rails 90 are deployable from a packed position within the housing 20, to an extended position parallel to the desired radial displacement of magnetic transducers relative to the disk. For this purpose, a pivot pin 92 follows a circular track defined by a slot 94 in a guide member, the movement of which is constrained to be substantially parallel to the rack 72.

Figure 5:
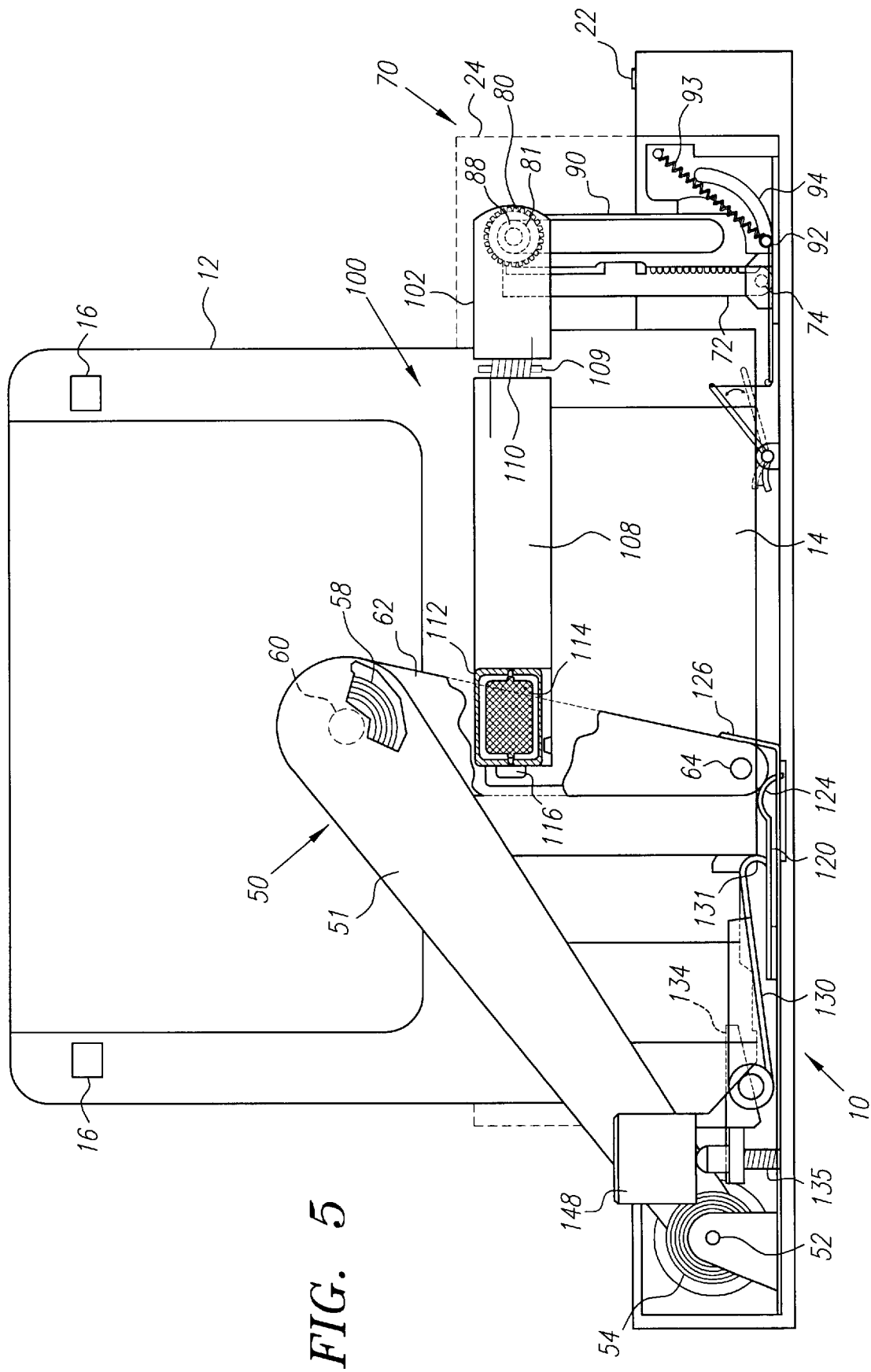
FIG. 5 is a side view corresponding to the view of FIG. 3, showing the deployable elements in unpacked position, in relation to a disk media.
Figure 6:
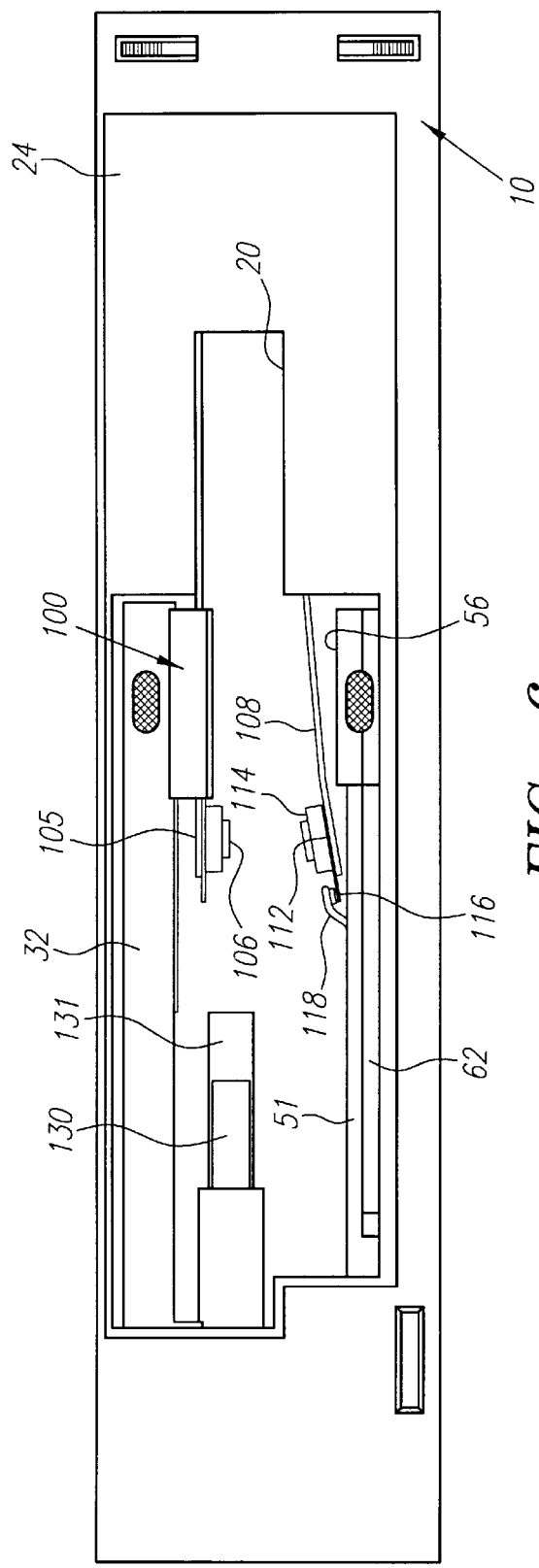
FIG. 6 is a top view of the system of FIG. 1, showing the elements in undeployed position.
Figure 7:
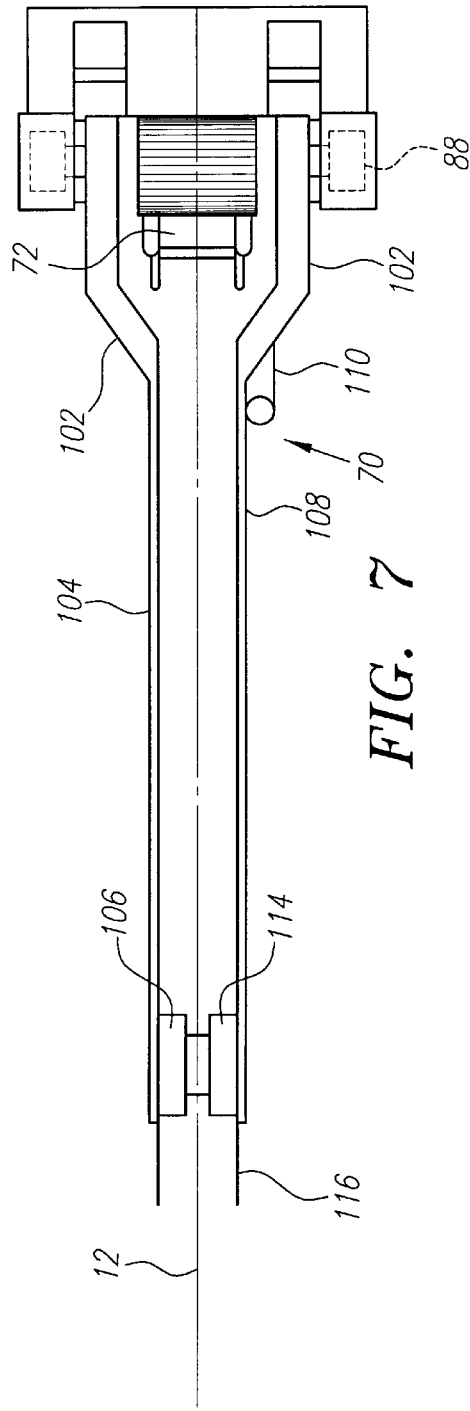
FIG. 7 is a fragmentary top view of the head positioning mechanism, in deployed position.
Figure 8:
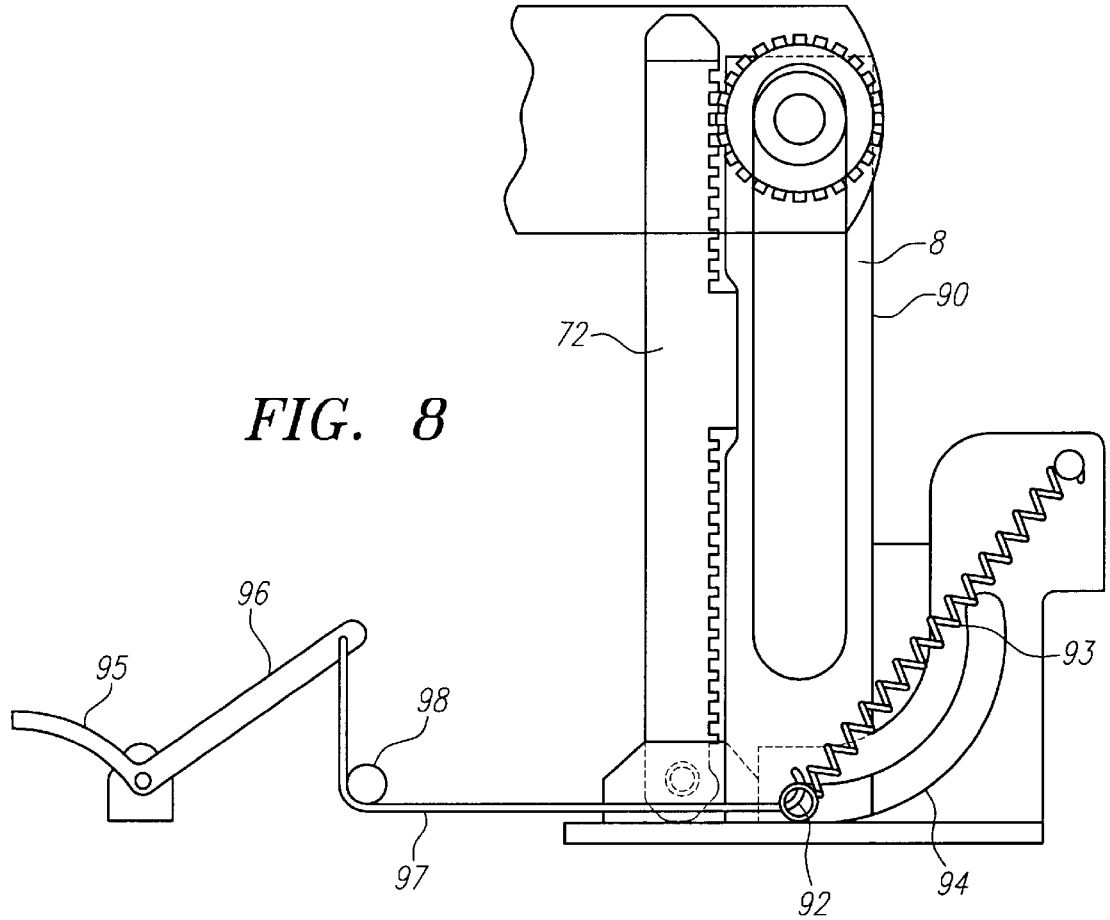
FIG. 8 is a side view of the mechanism of FIG. 7.
Figure 9:
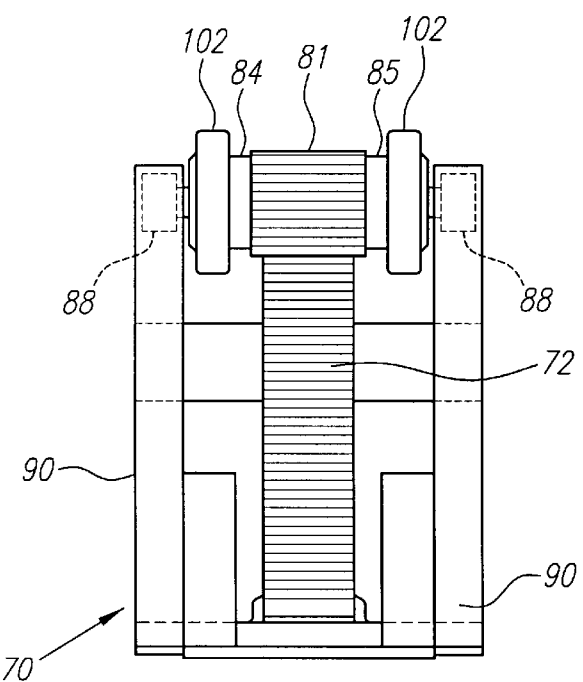
FIG. 9 is an end view of the mechanism of FIG. 7.

Referring to FIGS. 5 and 8, the pin 92 is biased toward the upper end of the slot 94 by a tension spring 93, shown in FIGS. 5 and 8 in the extended position, with the guide rails 90 extended and a cartridge 12 inserted. When the cartridge 12 is inserted, a sensor finger 95 in its path is engaged by the distal edge, raising a lever arm 96, the end of which is coupled by a flexible wire 97 to the pin 92, the wire 97 turning around a small roller 98. Upward movement of the end of the lever arm 96 to the position shown, from the dotted line position, pulls the pin 92 down, to the position shown, and extends the guide rails 90. The rack 72 is coupled to the guide rails 90 by springs (not shown) so that they move together between packed and deployed positions.

The dual sided magnetic head assembly 100 extends from bases 102 fixedly coupled to the end members 84, 85 on the head positioning mechanism 70. The bases 102 extend perpendicularly to the radial track to be followed on the disk, and on the hub side a support arm 104 holds a gimbal mount 105 (FIG. 6) (which may be omitted or replaced by a higher compliance spring, according to one of the known expedients) for the magnetic transducer 106. On the front side the support arm 108 is movable about a connecting pin 109 toward and away from the disk, but biased toward the disk (the "loading" direction) by a torsion spring 110. The other end of the support arm is coupled to a gimbal mechanism 112 for the magnetic transducer 114 on the front side. A loading tab 116 at the end of the gimbal mechanism 112 is positioned to be engaged by a finger 118 on the control arm 62, moving the transducer 114 to the unloaded position when the mechanisms are in the packed position.

Control of the position of the deployable drive devices 30, 50 is governed by cooperation of the transverse bar 64 with a detent strip 120 disposed along the base of the housing 20. At one end the strip 120 is curved to define a packing limit catch 122. In the intermediate region a raised curvature 124 provides a detent or toggle action with the spring force acting on the device 50. When the transverse bar 64 is at its deployment limit, it rests in a deployment limit catch 126, but can be forced manually toward the packed position, because the elbow is over center relative to the transverse bar 64, by a downward force at the top of the elbow. The control arm moves under manual pressure against the bias of the torsion spring 58, until the transverse bar 64 passes over the curvature 124, and reaches the fully compacted or latched position with the bar 64 in the packing limit catch 122.

A spring arm 130 having a hook end 131 is disposed lengthwise along the housing and normally positioned at an upward angle, along the plane of the slot 26 in the housing 20. When a cartridge 12 is inserted, the notch in its edge (seen in FIG. 1) adjacent the slider 14 that covers the recording area at the leading edge is engaged by the hook end 131 and shifted to expose the recording areas on each side to the magnetic transducers.

The deployment control mechanism operates off a snubber bar 134 (FIG. 10) which lies above the base of the housing 20 in line with the slot 26. The snubber bar 134 moves between vertical limits on a spring mount 135 having sufficient force to eject an inserted cartridge. A wishbone spring 136 having upstanding end elements 137 is mounted below the upper edge of the snubber bar 134, to move within side channels 138. When the snubber bar 134 is up, the end elements 137 exert spreading force laterally on the control arm 62, holding it away from the zone of the insertion slot and any inserted cartridge. The control arm 62 also unloads the movable transducer support arm 108 on the front side by engagement of the unloading tab 116. When the snubber bar 134 is in the down position, the channel 138 brings together the end elements 137 of the wishbone spring 136, allowing the helical clamping spring 54 to move the clamp pad 56 into its support position against an inserted disk.

When the snubber bar 134 is moved down by disk insertion and latching force, it is latched by a rocker-type locking latch 140 that turns about a pivot 142 and is held in place by a latch spring 144. A disk eject button 148 at the side of the housing 20 is pressed downwardly by the operator to overcome the latch spring 144 and allow the snubber bar 134 to move up, forcing the clamping mechanism to unload before freeing and moving up the disk.

The extendible frame 24 in the housing 20 is spring biased with a light force toward the closed or down position, but moves upwardly when the head positioning mechanism 70 is moved up to deployed position. When the deployable rack 72 and the guide rails 90 are returned to the packed position, the extendible frame 24 closes to its compact position. This protection may not be needed in a variety of circumstances. Alternatively however, a hinged cover (not shown in FIGS. 1–12) may be used to cover the slot.

It will be appreciated, therefore, that the compact external form factor seen in the view of FIG. 1 contains a fully functional disk drive assembly which provides recording and reproduction functions in conventional fashion, after deployment and which can be returned to the packed configuration as desired. Although depicted in conjunction with a 3-½" floppy disk the general approach is suitable for 5-¼" floppies, floppies smaller than 3-½" and other forms of rotatable disk media.

Starting with the undeployed or packed configuration, as in FIG. 1, the user deploys the chuck and drive mechanism, 30, comprising the two arms 32, 51, and the head positioning mechanism 70. This can be done automatically by inserting the cartridge 12 in the slot 26 in the housing 20, engaging the internal snubber bar 134. The insertion of the cartridge 12 also engages an end of the packing latch 122, causing it to release the transverse bar 64 on the end of the control arm 62, allowing it to move toward the deployment limit catch 126, aided by the torsion spring 58 at the elbow. Alternatively, the eject button 148 can be pressed to release the packing latch 122. Both arms 32 and 51 deploy together, and the release of the pressure of the wishbone spring 136 end elements 137 against the control arm 62 allows the helical clamping spring 54, to urge the clamp pad 56 against the front face of the cartridge 12. The drive chuck 42 in turn thus engages the hub on the back side of the cartridge 12 and the motor drives the internal disk through the hub on the cartridge 12.

Concurrently, the deployable head positioning mechanism 70 is pivoted upwardly, about the rack pivot pin 74, with the adjacent guide rails 90 moving in tandem to a limit position defined by the end of the circular guide slot 94. In the packed position the magnetic head assembly 100 is at the base of the positioning mechanism 80 (at the outer disk radius) so that it moves only through a small arc, with the support arms 104, 108 being lengthwise to the housing 20, where they remain during operation. The extendible frame 24 within the housing 20 moves out with the rack and guide rail mechanisms to protect the head assembly.

Concurrently also, as the cartridge 12 is inserted, its leading edge contacts the spring arm 130, forcing it through an arc as the hook end 131 opens the slider window 14 on the cartridge 12. With the recording areas exposed on both sides of the cartridge 12, closure movement of the front control arm 62 allows the unloading tab 116 on the head assembly 100 to move in with the holding finger 118 on the control arm 62, initiating head-to-disk contact on both sides of the disk. The snubber bar 134 is held securely down by the locking latch 140 and associated spring 144, and since the cartridge 12 is clamped, and the drive motor 36 is turning the drive chuck 42, and disk data transfer operations can begin.

In operation, with the disk running constantly, conventional circuits for commanding track location energize the internal motor in the drive pinion 80, moving the drive pinion 80 and the associated head assembly 100 to selected radial track positions. When use of the particular cartridge has been completed, the head assembly 100 is parked at the outside radial position and the disk eject button 148 may be pressed to release and eject the cartridge 12.

Pressing the disk eject button 148 overcomes the locking latch spring 144 force, allowing the locking latch 140 to release the snubber bar 134, and initiating the separation of the front dual link device 50 from the cartridge 12, as the wishbone spring 136 end elements 137 overcome the helical clamping spring 54. As this takes place, the front magnetic transducer 114 is unloaded from the disk as the control arm 62 and finger 118 acting on the unloading tab 116 move outwardly. The cartridge 12 is then free to rise and be extracted. The internal spring in the cartridge 12 which biases the slider loses contact with the slider window 14 on the cartridge 12, so that the window 14 closes and the recording areas are again covered.

The extended drive mechanism 30 and head positioning mechanism 70 may then be returned to the packed position unless it is desired to insert a new cartridge 12. The top surfaces at the ends of the arms 32, 51 can be pressed down, overcoming the detent action of the deployment limit catch 126 and forcing the transverse bar 64 over the toggle curvature 124 to complete the closure action. The release of the cartridge 12 also draws the rack 72 and guide rail 90 structures down about their base pivots 74, 92 until the closed, compact positions are reached.

It will be appreciated that a number of different mechanisms can be employed in different parts of the system to achieve like results. Different deployment structures can be used, such as single arms movable through an arc manually or by small torque motors. The deployment control devices can vary substantially as long as the essential functions are established. No expandable housing need be used, under many circumstances, or alternatively one may expand to a substantially larger outline.

Figure 12:
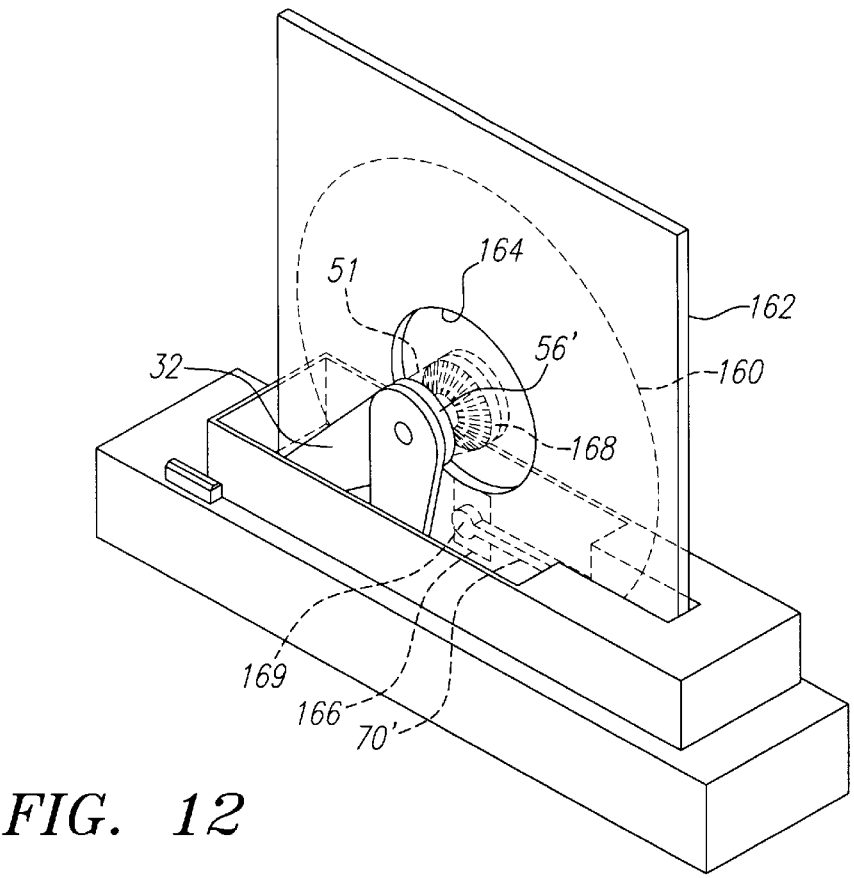
FIG. 12 is a perspective view of a deployable drive system for a CD-ROM.

The view of FIG. 12 depicts a CD-ROM drive in accordance with the invention, in which the compact disk 160 is disposed within a rectangular housing 162 having a central aperture 164 in both sides and a transparent radial window 166 on one broad face. The unit includes pivot arms 32, 51 and a rotatable clamping pad 56' on the front side, but the disk 160 is engaged at its central bore by a centering hub 168 that positions as well as grips the disk 160. The deployment and packing operations are the same as previously described. The sensor system 169 for reading the compact disk 160 is shown only generally, and is understood to include a laser illuminator and an adjacent sensor device which senses laser light reflected off the selected disk track. The deployable head positioning mechanism 70' may be constructed and operated as in the example of FIGS. 1–11, but senses only one side of the compact disk 160.

In operation, a compact disk 160 in its rectangular housing 162 is entered into the receiving slot in the housing 20, initiating the deployment actions. The disk 160 is driven via the arm 32, held in place by the rotatable clamping pad 56'. The sensor system 169 is translated radially along the window 166 as the recorded patterns are read. The CD-ROM capability can thereby be added to a system in a wide variety of configurations.

A more specific example of a deployable CD-ROM mechanism, in a smaller than media size configuration, is shown as used along one side of the housing of a small, low profile portable notebook computer 170, in FIGS. 13–20, to which reference is now made. An elongated rectangular chamber 172 is included in the computer 170 sidewall, the chamber in this practical example having a height of 0.709 inches (18 mm), and a length of 5.197 inches (132 mm) and a depth of 1 inch (25 mm), these dimensions including the wall thicknesses. Side slots 173 (FIG. 15) on the outer surface of each end wall are horizontally angled (using the frame of reference of FIG. 13), for receiving an attachable cover when a pivotable lid 174 mounted along the lower longitudinal edge of the chamber 172 is opened. The lid 174 is biased by a torsion spring 175 (FIG. 16) to be closed when the internal mechanism is nested, but is automatically opened when the internal mechanism is deployed.

A snap-on cover 176 (FIGS. 13 and 17) of generally rectangular form and dimensions chosen to receive a CD-ROM and a drive mechanism with close but adequate clearance has an open side conforming generally to the outline of the chamber 172 edges. Locking tabs 177 (FIG. 13) extending from each side of the cover 176 are positioned to mate with the side slots 173 of the chamber 172. To lock the snap on cover 176 in position when fully inserted, a conventional detent mechanism (not shown) may be employed or alternatively a spring loaded, manually released latch, may be used at each side. A CD-ROM 178 whose data is to be reproduced may be of the 5" diameter configuration now in wide use, but the unit can also accommodate smaller sizes. Where a smaller size disk standard is to be used exclusively, the chamber 172 and the deployable mechanisms are accordingly scaled down in size.

Figure 13:
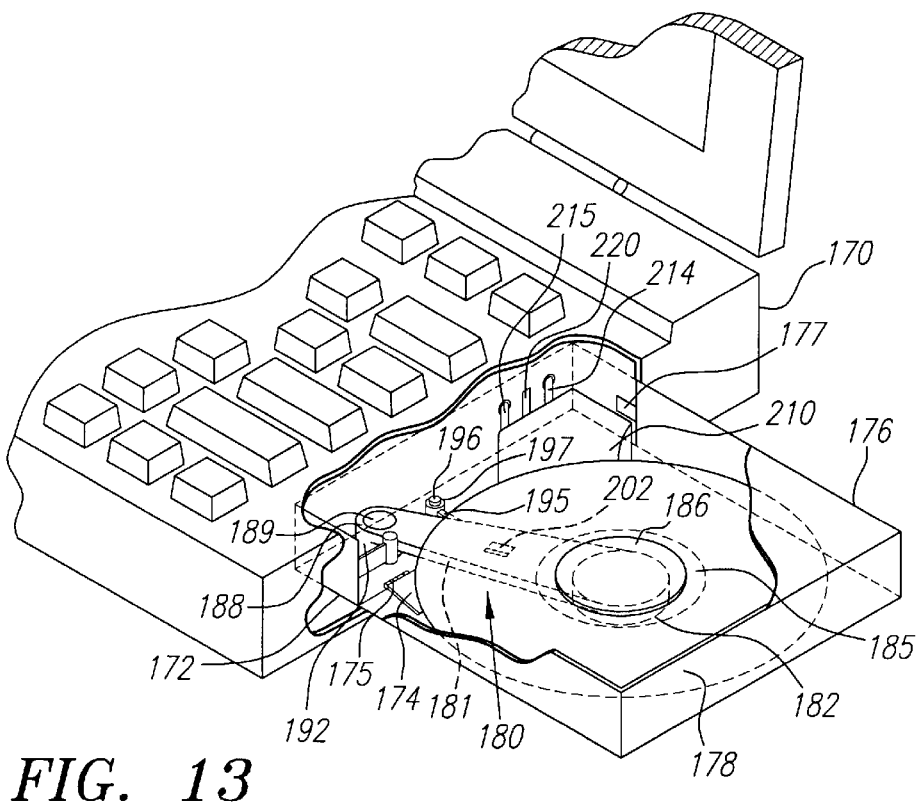
FIG. 13 is a perspective view, partially broken away, of a deployable and smaller than media size CD-ROM mechanism, shown in the deployed position.
Figure 14:
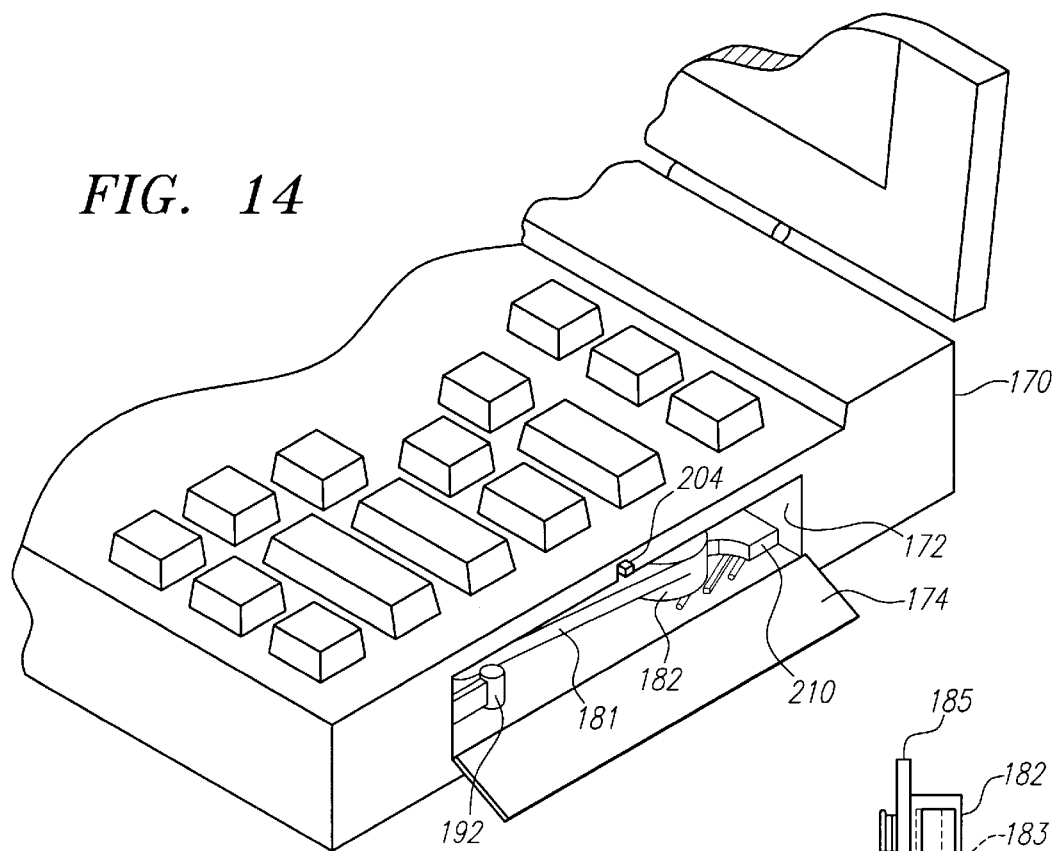
FIG. 14 is a fragmentary perspective view of the arrangement of FIG. 13, shown substantially in the nested position.
Figure 16:
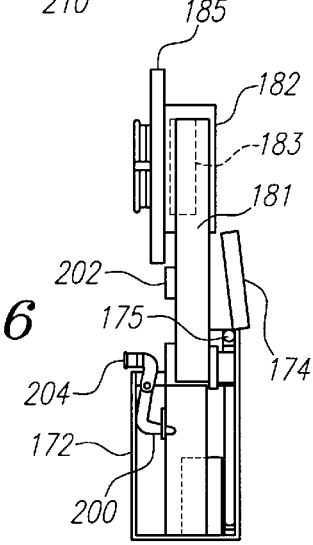
FIG. 16 is a side view with the mechanisms corresponding to the position shown in FIG. 15, again without the media.
Figure 15:
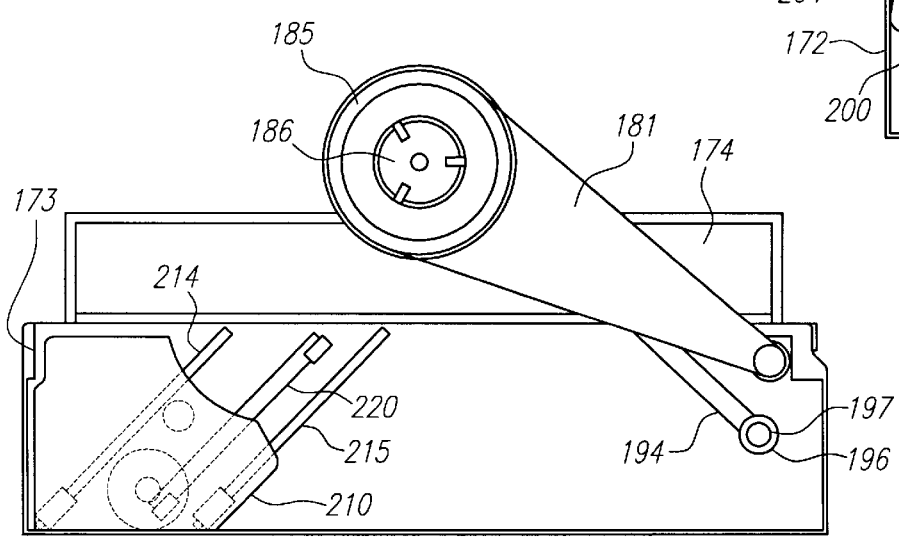
FIG. 15 is a plan view of the arrangement of FIGS. 13 and 14, with a drive mechanism in the deployed position and a transducer mechanism in the nested position, the media not being shown.
Figure 19:
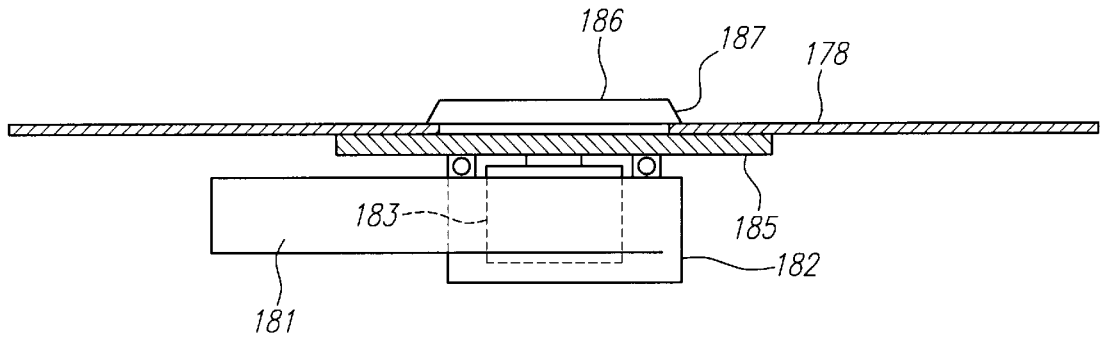
FIG. 19 is a fragmentary side view of the CD-ROM on the center drive chuck in the arrangement of FIGS. 13 to 18.
Figure 20:
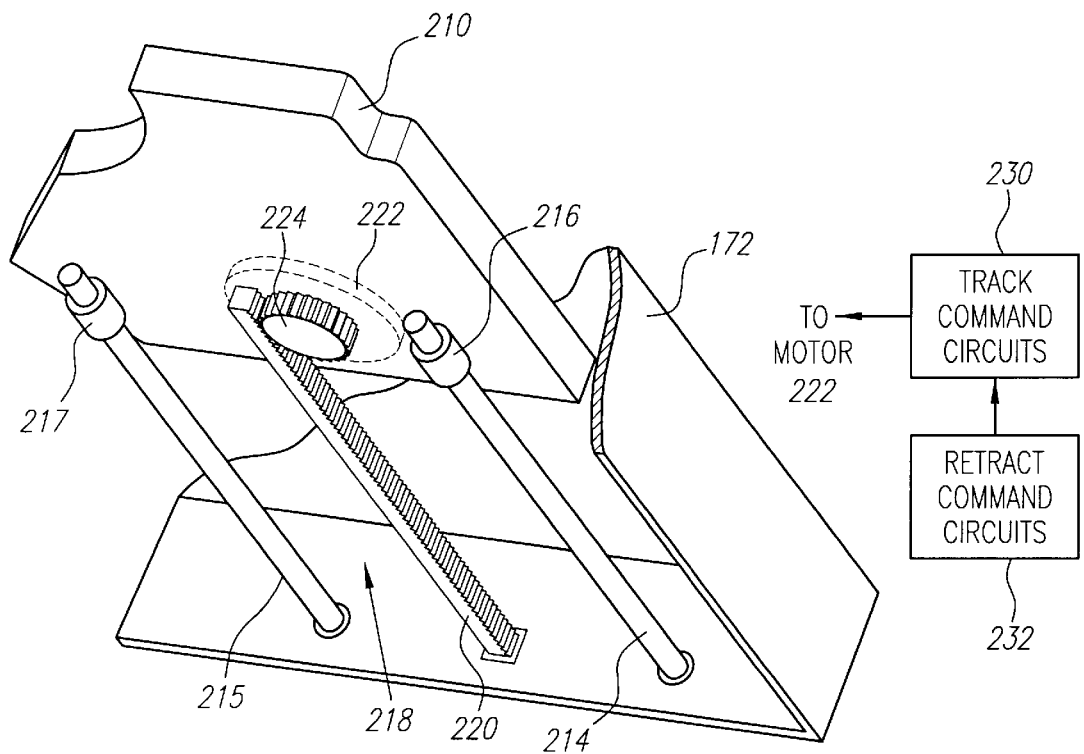
FIG. 20 is a perspective view of the underside of the transducer mechanism, showing further details thereof.

A CD-ROM disk drive 180, shown in the deployed position in FIG. 13 and shown in phantom in the nested position in FIGS. 17 and 18, comprises a radial arm 181 extending from a pivot end adjacent one longitudinal end of the chamber 172 and supports, at its free end, a hub 182 containing a drive motor 183, as best seen in FIGS. 16 and 19. Energizing signals for the motor 183 are supplied along conventional flex cables (not shown) coupled from within the chamber 172 to the arm 181, where conductors extend to the hub 182 and motor 183. The motor drives a rotatable support ring 185 (FIG. 19) mounted on the upper side of the hub 182, the support ring 185 being surmounted by a resilient holder cap 186. The CD-ROM 178, to be used for data retrieval with the computer 170 system, is placed by the operator on the support ring 185, around the resilient holder cap 186, which has a seating diameter engaging the CD-ROM 178 inner radius and a yielding lip 187. The inner surface of the central aperture of the CD-ROM 178 is thus securely held in place, both angularly and in its plane, frictionally during operation. The CD-ROM 178 is removed simply by manual force overriding the friction and the restraint of the lip 187. Alternatively, the support ring 185 and holder cap 186 structure could incorporate extendible internal fingers that retract to receive the CD-ROM 178, but can be manually or automatically extended to lock it in place on the support ring 185.

At the pivot end of the arm 181, the arm includes a pivot bearing engaged about a pivot pin 189 adjacent the chamber 172 wall at that end, and proximate a stop shoulder 192 for limiting deployment movement of the arm 181.

Deployment force for the disk drive arm 181 is provided by an extender arm 195 pivotably mounted on a second pivot pin 196 between the drive arm 181 and the back wall of the chamber 172, and biased radially outwardly from within the chamber 172 by a torsion spring 197. A slot 198 (which may alternatively be a groove) in the drive arm 181 receives a follower pin 199 at the free end of the extender arm 195 to turn the disk drive arm 181 outwardly to the limit position when released as described below. Alternatively, a toggle mechanism (not shown) may be used to shift the disk drive arm 181 between stable nested and deployed positions, but in either event, the deployed disk drive arm 181 is returned to the nested position by manual force, since the disk must be handled manually in any event.

In the upper wall of the chamber 172 is provided a nesting catch 200 (FIGS. 16 and 17) that engages a lock tab 202 (FIGS. 13 and 17) on the drive arm 181 when the drive arm 181 is nested. The catch 200 can be released by a catch release button 204 (FIGS. 14 and 16) on the computer 170 housing to allow the drive arm 181 to pivot outwardly to the deployed position under spring force.

A transducer mechanism 210, seen in FIGS. 13, 15, 17 and 20, is positioned and controlled so as to slide beneath a mounted CD-ROM 178, with a conventional sensor 212 (typically a semiconductor laser and optics directing a beam against a selected track on the CD-ROM 178 underside and returning a pattern modulated beam to a photosensitive element) positioned adjacent the forward end of the transducer 210. The transducer 210 moves on guide rails 214, 215 that angle from adjacent the second longitudinal interior end of the chamber 172, approximately radially along a CD-ROM 178 installed on the support ring 185. Bearings 216, 217 mounted on the transducer 210 slide along the angled guide rails 214, 215 being positioned on the transducer 210 so that the sensor 212 extends outside the volume of the chamber 172 to cover the full radial span of tracks on the CD-ROM 178.

A track selection mechanism 218 for the transducer 210 comprises a rack 220, extending from the interior of the chamber between the guide rails 214, 215 and parallel thereto. A motor 222 on the transducer 210 drives a pinion 224 engaging the rack 220 for precise positioning of the transducer 210 relative to tracks on the CD-ROM 178. Conventional track command circuits 230, shown only generally, may include a retract command circuit 232 responsive to signals from a microswitch or other detector which indicates when the snap-on cover 176 is removed so the retract circuits then command the transducer 210 to move to the nested position.

The sequence of operation of the CD-ROM deployable system of FIGS. 13 to 20 proceeds as follows after a CD-ROM 178 has been selected for play. The nesting catch 200 is released by pressing the catch release button 204, freeing the lock tab 202 on the drive arm 181, with the extender arm 195 pivoting the disk drive arm 181 to the fully deployed position. The CD-ROM 178 is mounted about the holder cap 186 and secured under the resilient lip 187 on the support ring 185. The snap-on cover 176 is then placed in position, with the locking tabs 177 fitted into the side slots 173 in the chamber 172, so that the cover 176 fully encompasses the CD-ROM 178 and protects the operative elements from external interference as well as impurities. As soon as the cover 176 is engaged, which may be detected by automatic means, the CD-ROM drive motor 183 can be turned on, and the transducer 210 activated, so that the system is ready to select a track for data playback. Operation then proceeds in the manner conventional with digital CD-ROMs, with the computer 170 or the operator choosing the desired segments of the disk for data reproduction.

When the CD-ROM 178 is to be changed, the drive 180 is stopped, the cover 176 is removed and a new CD-ROM is exchanged for the old, the cover 176 being replaced and operation commencing as previously.

When the unit is to be renested, the disk drive 180 is stopped, the cover 176 is removed and the transducer 210 then returns to the nested position within the chamber 172. The operator manually returns the disk drive arm 181 to the nested position against the extender arm spring, where it is secured by the nesting catch, as the chamber 174 closes.

This arrangement, therefore, takes up a minimum of space in the side of the notebook computer 170, reducing internal space requirements and weight as well. Furthermore, the CD-ROM itself is fully protected, along with the associated mechanism, since the snap-on cover may be made as sturdy as desired. Alternatively, a built-in cover arrangement can be incorporated, as described below, to encapsulate the media and assembly, taking the place of the separate attachable cover 176.

Systems in accordance with the invention further take advantage of the fact that the typical user will have a number of CD-ROMs and will need to transport and carry such elements in a protected but compact fashion. The snap-on cover, which can be associated with this transport arrangement, imposes no substantial additional penalty of size or inconvenience.

Figure 21:
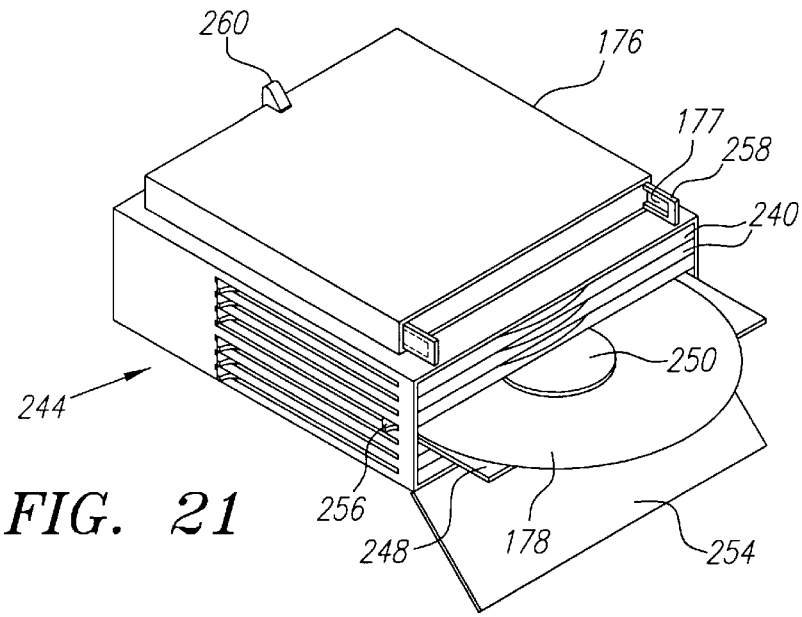
FIG. 21 is a perspective view of a portable storage and cover arrangement that may be utilized with the device of FIGS. 13 to 20.

One suitable arrangement for a storage cassette 244 with incorporated removable snap-on cover 176 is shown in FIG. 21. The cassette 244 is for holding a number of CD-ROMs 178, and has a number of stacked disk chambers 246, each with an internal slide mechanism 248 including a central resilient ring 250 for retaining a different CD-ROM 178 by its central aperture. A front cover 254 can be opened to permit individual side levers 256 to be used to slide any selected CD-ROM 178 out for selection, or position the mechanism out to receive a CD-ROM 178 to be stored. The snap-on cover 176 is attachable to the top surface of the cassette 244, by side slots 258 which receive the locking tabs 177 on the cover and a spaced apart resilient finger 260 which holds the opposite end of the cover 176 in place. This mechanism enables approximately six CD-ROMs to be stored and transported in a housing having a total thickness of less than two inches, including the snap-on cover.

Figure 22:
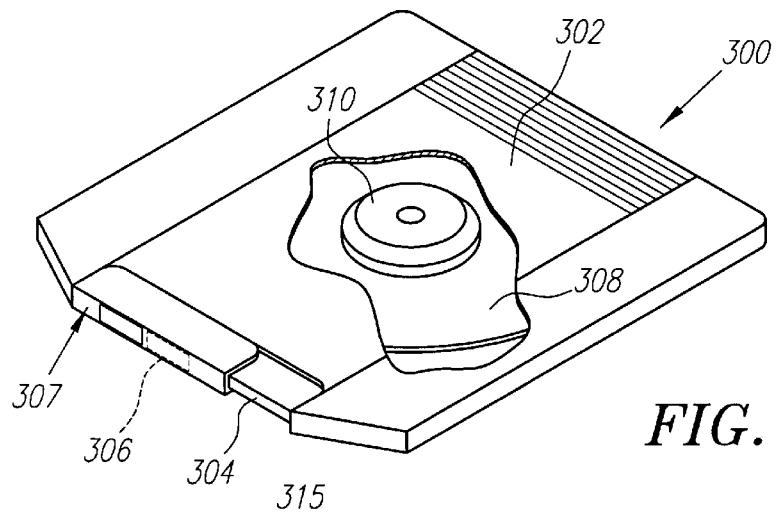
FIG. 22 is a perspective view, partially broken away, of a removable storage media cartridge of the "ZIP" type that is used in a different example of a system in accordance with the invention.
Figure 23:
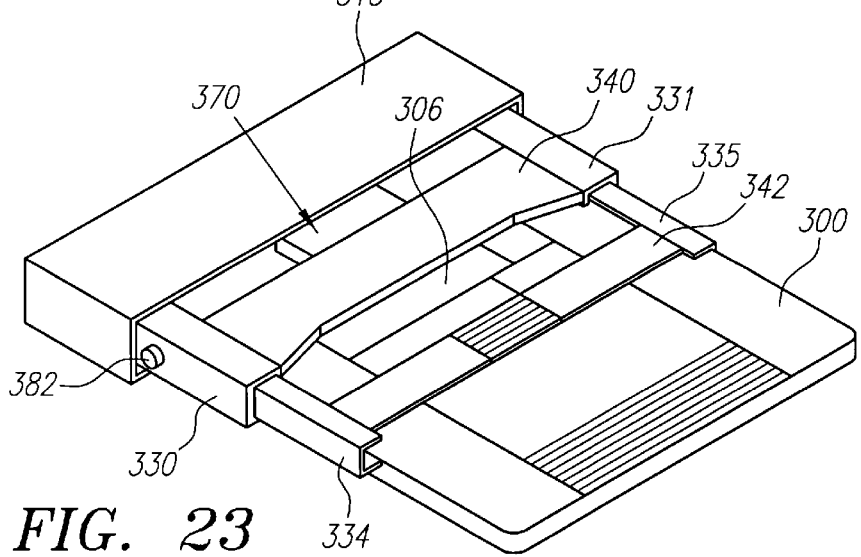
FIG. 23 is a perspective view of a deployable drive and transducing system that may be utilized with a cartridge of the type shown in FIG. 22, with the drive mechanism extended and a cartridge inserted.

In a different arrangement in accordance with the invention, a smaller than media size drive is feasibly configured to function with a high density removable disk cartridge of the type referred to as a "ZIP" cartridge, and manufactured and sold by Iomega and other manufacturers, in conjunction with appropriate drive mechanisms that receive the entire cartridge. As seen in FIG. 22, the ZIP cartridge 300 has a generally rectangular housing 302 that is relatively shallow or thin in the height dimension, being approximately ⅜ inch thick. The distal or inserted edge 304 has an access opening 306 covered by a sliding door 307 which is spring loaded to be closed, but is opened when the cartridge 300 is inserted for operational use. The magnetic disk 308 within the cartridge is centered about a rotatable hub 310 having a central drive axis, the exterior portion of the hub being exposed through a broad wall of the cartridge 300 for engagement by a driving means configured to mate with the hub 310. This type of magnetic disk cartridge has come into wide use because it has a high capacity for a rotatable media (100 MB is typical) and because it has moderate speed access times at relatively low cost. After the access door 307 is opened, the transducer mechanism (not shown in FIG. 22) which is inserted for coaction with the magnetic disk is small enough to fit within the cartridge housing 302 and is moved radially by mechanisms which are now well known to be positioned for recording or playback at any particular selected track position.

A smaller than media size system, referring now to FIGS. 23–29, for coaction with the ZIP media is confined, in nested relation, within a generally rectangular enclosure 315, typically a five-walled unit for fitting into a small space in the side of a laptop or other PC computer. Although the housing or console of a PC can be configured to provide the necessary fixed base mounts for the different operative elements in the structure, it will be described in terms of the depicted walled unit having an open side (which may be closed by a hinged door if desired), a height of only approximately one inch, and a depth of approximately 1-¼ inches. The side walls 317, 318, which will be called the first and second side walls, are spaced apart by a distance greater than the lateral dimension of the cartridge 300 (about 4 inches) but the depth of the enclosure 315 from the open side 320 (FIG. 24) to the back wall 322 is substantially less than the center to distal end distance, which is substantially the radius of the internal magnetic disk, of the cartridge 300. Thus, the enclosure is substantially smaller than media size, and in this instance, a cartridge 300 in operative position (see FIGS. 23 and 28) is completely outside the enclosure 315. The operative position is defined as one in which the cartridge 300 is in a plane intersecting the enclosure 315 in a mid region between the upper and lower sides, and in which the central drive axis of the cartridge 300 is along a substantially central line in the horizontal plane between the end walls 317, 318 of the enclosure 315.

Adjacent to the first and second side walls 317, 318, respectively, are a pair of telescoping side guides 325, 326, (FIGS. 26–28) also labeled first and second for reference only. Apart from mechanisms which they support, they are substantially alike and internal details described for one will apply to other as well. The side guides 325, 326 fit in shallow top and bottom retainer grooves 328 in the enclosure 315 and include base legs 330, 331, respectively, each having an inside U-shaped groove 332 which slidably receives an outer leg 334 or 335, respectively. Grooves 336 (FIGS. 27–29) on the inner side of the outer legs 334, 335 are dimensioned and shaped to receive, with a sliding fit, the opposite side edges of a ZIP cartridge 300. The base legs are interconnected by a base cross arm 340, while the outer legs are interconnected by an outer cross arm 342. These cross arms 340, 342 are substantially parallel to the horizontal insert plane for the cartridge, but at a vertical gap from the insert plane to provide clearance for the cartridge and internal mechanisms as well. When the base legs 330, 331 and outer legs 334, 335 are in fully deployed position (FIGS. 23, 27 and 28), they are extended outwardly from the enclosure 315, while when they are in the nested position (FIGS. 24 and 25), they, along with the other operative units are contained within the volume of the enclosure 315. Detents and locks (not shown) may be incorporated, in conventional fashion, to hold the legs in nested or deployed position with a retentive force which can be manually overcome when desired.

As seen in FIGS. 23–29, a drive chuck 350 positioned below the horizontal plane of an inserted cartridge serves both to support and rotate the disk inside the cartridge. A short pivot base 352 engage a pivot pin 354 that is vertically disposed in a bracket 355 (FIGS. 27 and 28) in the lower ledge of the first telescoping leg 330, so as to pivot about the axis of the pivot pin 354 in a plane below the plane of the cartridge 300. A torsion spring (not shown) in the bracket 355 and a knife action spring 356 mounted in a recess in the first base leg 330 so as to engage a bearing surface 358 on the side of the pivot base 352, bias the pivot base 352 to rotate outwardly in the clockwise direction (as seen in the plan view of FIGS. 26 to 28). The fully extended position is determined by the bearing surface 358 angle relative to the knife action spring 356. A rotary arm 360 that is an extension of the angular position of the pivot base 352 is coupled to the base by a hinge 362 including a transverse pin 363. The rotary arm 360 can hinge upwardly through a relatively small angle about the pin 363 so that a drive hub motor 364 at its free end can engage the underside of the center hub 310 (FIG. 22) of the cartridge 300, or it can pivot downwardly away from the plane of the cartridge 300 so as to provide clearance for entry. A central locator pin 366 on the drive hub 364 has an outer surface which engages the central hub 310 of the internal disk in conventional "ZIP" drive fashion. The drive hub motor 364 then provides the needed rotational velocity for the internal disk. A side tab 368 extending outwardly from the intermediate region of the rotary arm, in an inward direction, is used in controlling lifting and release of the drive hub 364, as described below.

Figure 25:
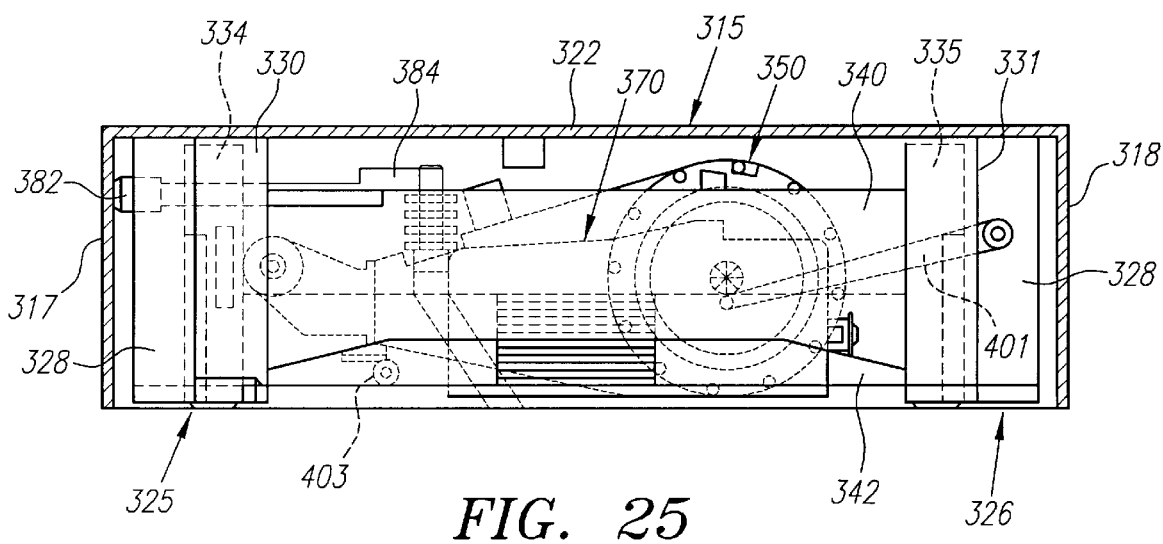
FIG. 25 is a plan view of the arrangement of FIGS. 23 and 24, showing the arrangement in nested position without a top cover.
Figure 26:
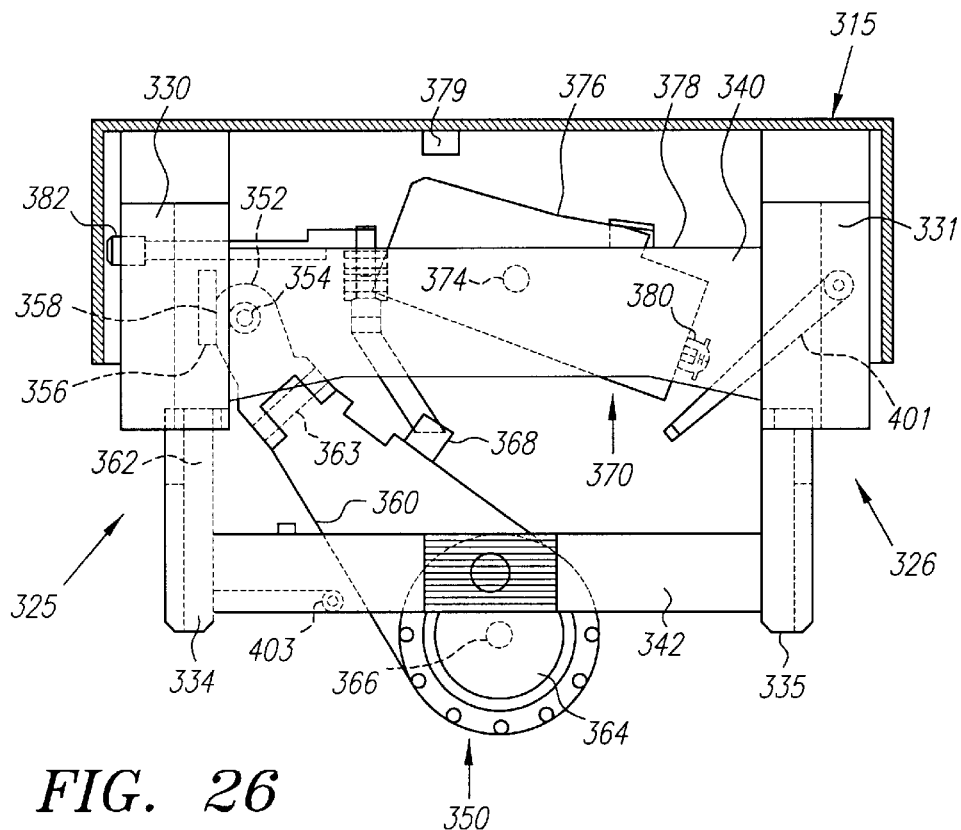
FIG. 26 is a plan view of the arrangement of FIGS. 23 to 25, showing the mechanism in partially extended position in plan view.
Figure 27:
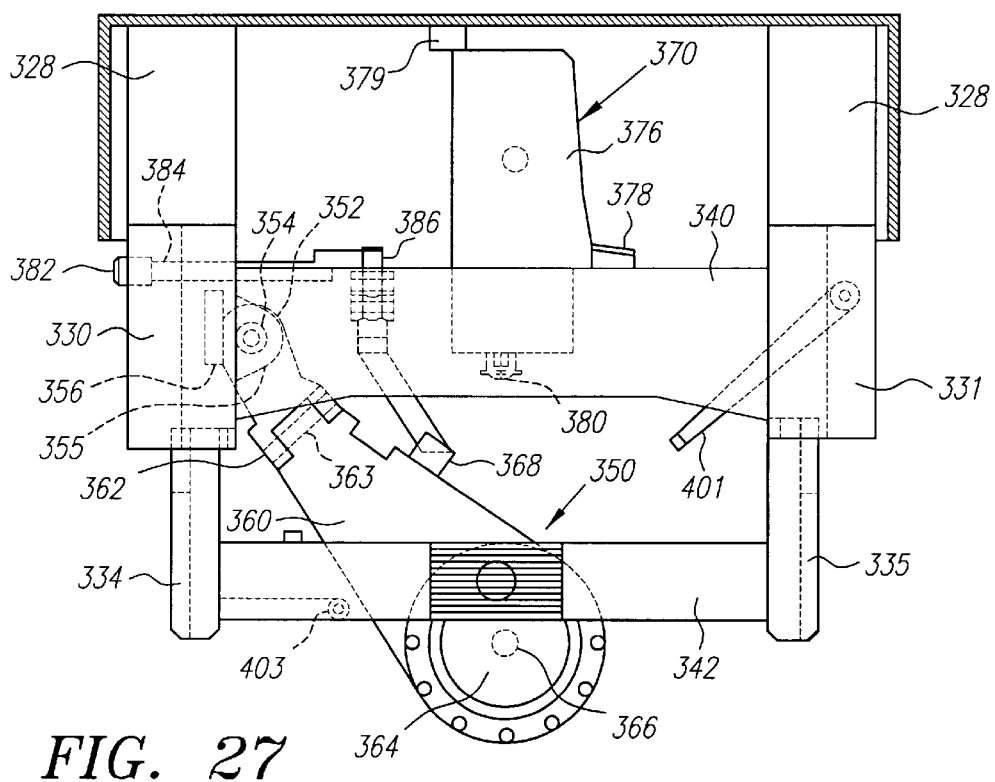
FIG. 27 is a plan view of the mechanism of FIGS. 23 to 26 in fully extended position, without a cartridge inserted.
Figure 28:
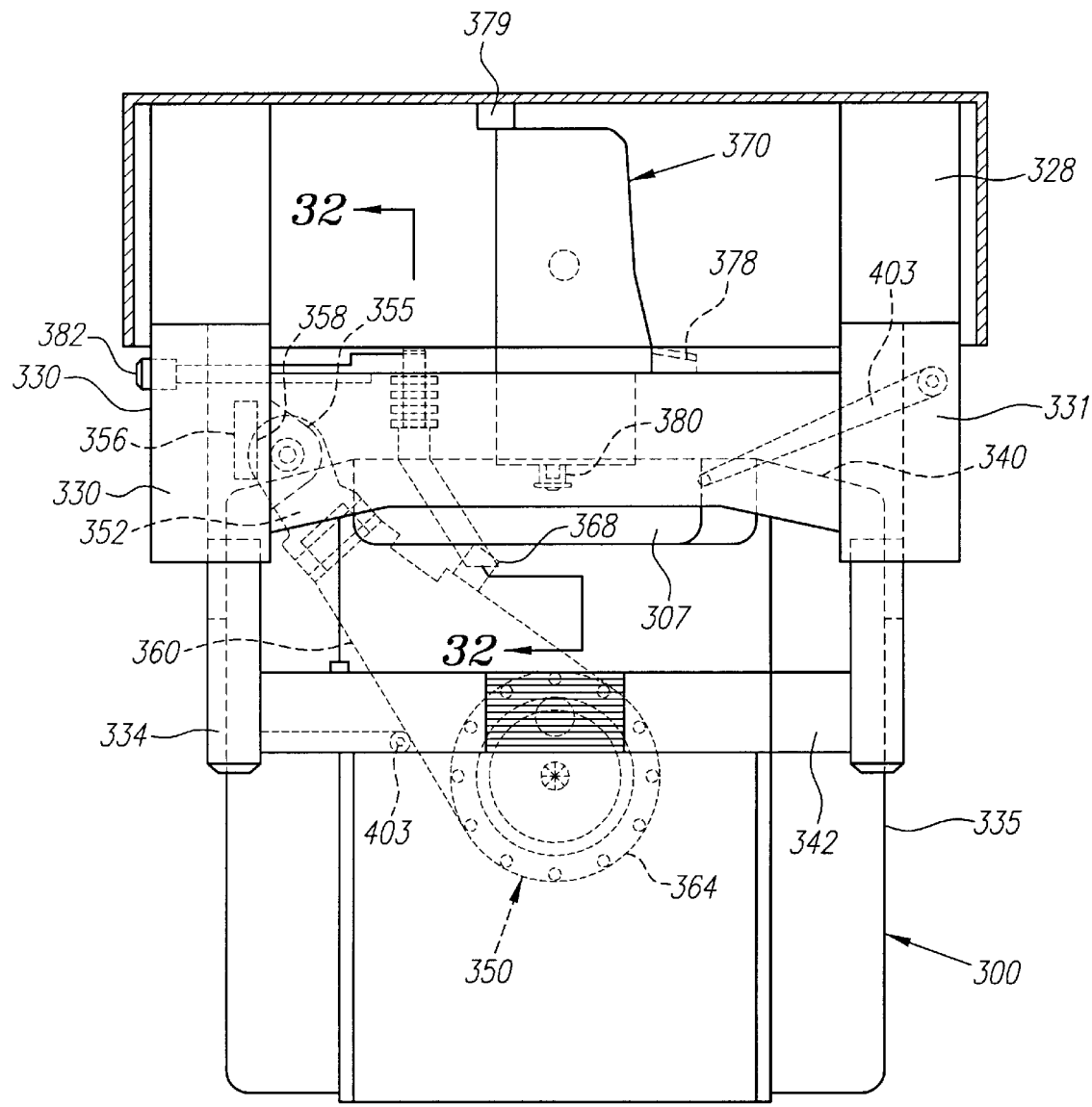
FIG. 28 is a plan view of the mechanism of FIGS. 23 to 27 in fully extended position with a cartridge inserted.
Figure 29:
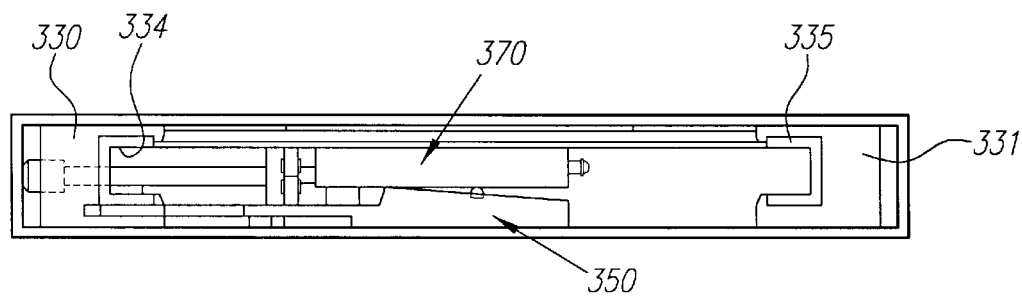
FIG. 29 is an end view of the mechanism of FIGS. 23 to 28, with the internal elements in nested position.
Figure 30:
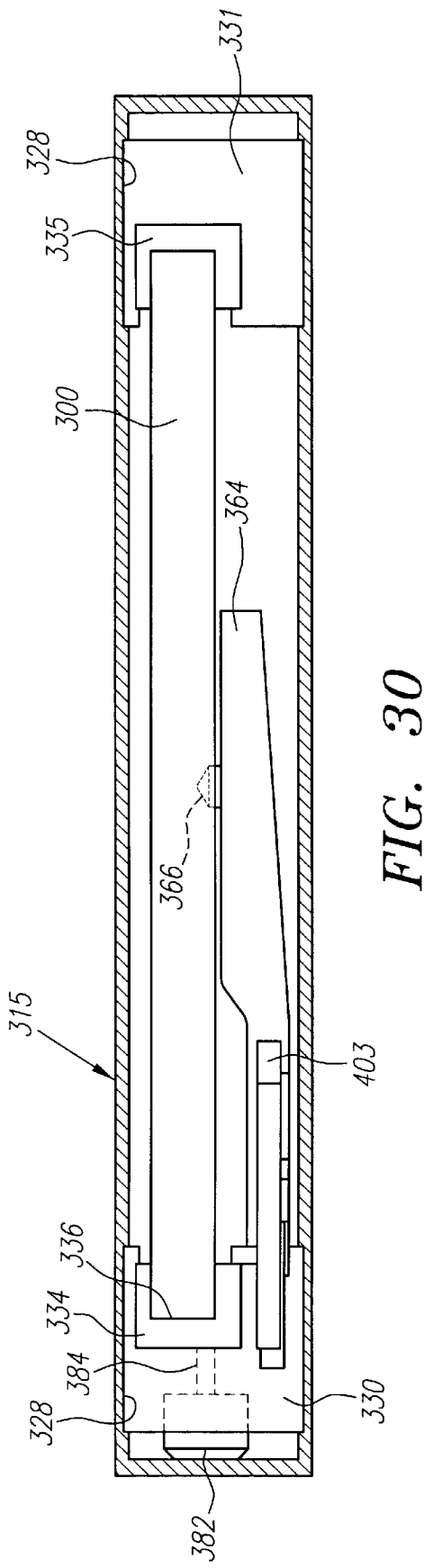
FIG. 30 is an end view of the mechanism of FIGS. 23 to 29 showing the chuck engaged into the cartridge.

The transducer mechanism 370 for cooperation with the interior magnetic disk in the cartridge 300 comprises a low profile body 372 (FIGS. 27 and 29) mounted to swivel about a pivot pin 374 in the lower wall of the enclosure 315, pivoting clockwise from a nested position as seen in FIG. 25 to a deployed position as seen in FIG. 28. In the deployed position the central axis of the body 372 is in alignment with the central drive axis of the disk in an inserted cartridge 300. A contoured side wall 376 on the body 372 is engaged by a positioning finger 378 on the proximal side of the base cross arm 340, to swivel the body 372 into the deployed position against a stop 379. A tensioning spring (not shown) at the pivot is employed to bias the body 372 in the counterclockwise direction so that it nests as the mechanism is returned to the compact position At the distal end of the deployed body 372, transducer heads 380 of low profile are insertable through the access opening of the cartridge 300, and positioned by conventional interior drive means (not shown) at selected radial positions.

Thus, as seen in the contrasting figures which show the nested position (FIGS. 24 and 25) and those which show the deployed position (FIGS. 23, 26, 27 and 28), the telescoping side guides 325, 326, the base and outer cross arms 340, 342, the drive chuck 350 and the transducer mechanism 370 are all confined within the volume of the enclosure 315. Nonetheless, they are deployable outwardly beyond the enclosure so as to hold the cartridge 300 (as seen best in FIG. 23) in operative relation to the drive and transducing elements.

Figure 31:
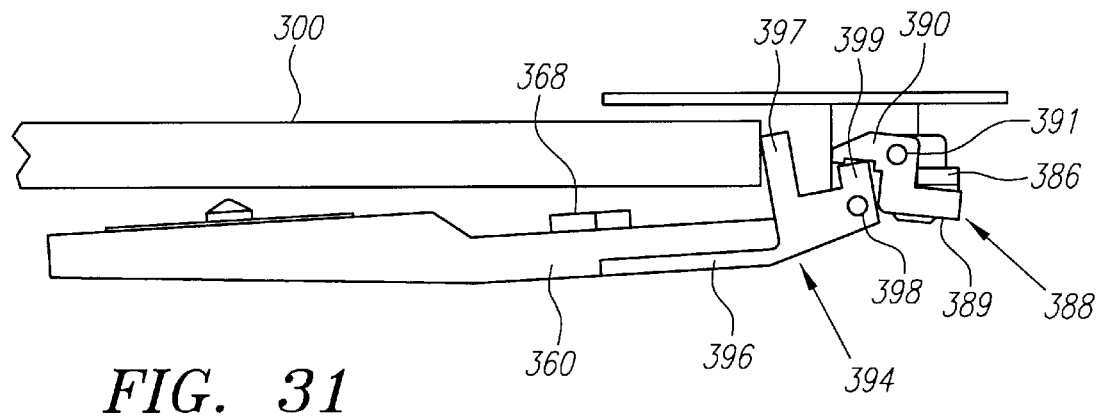
FIG. 31 is a fragmentary side view of the chuck engagement and cartridge release mechanism, showing the chuck disengaged from the rear of the device looking outwardly.
Figure 32:
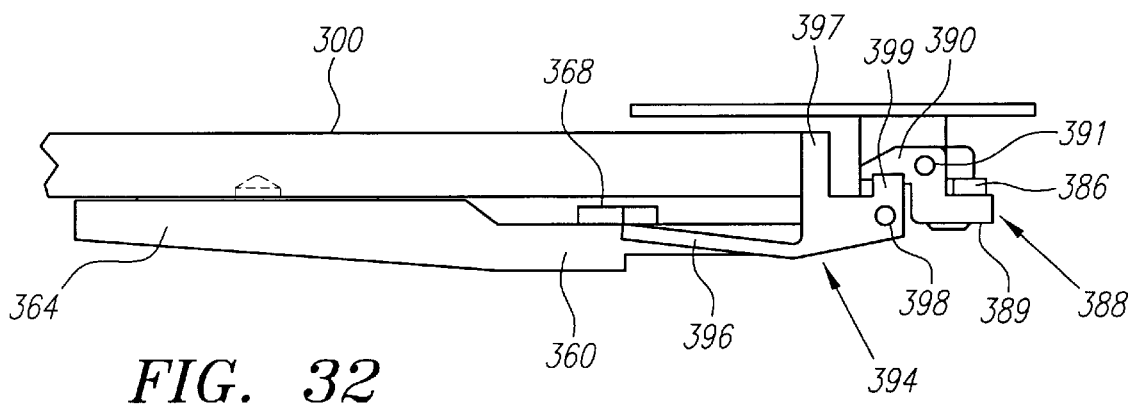
FIG. 32 is a fragmentary view corresponding to FIG. 31, but with the chuck in engaged position and taken along the line 32—32 in FIG. 28, looking in the direction of the appended arrows.
Figure 33:
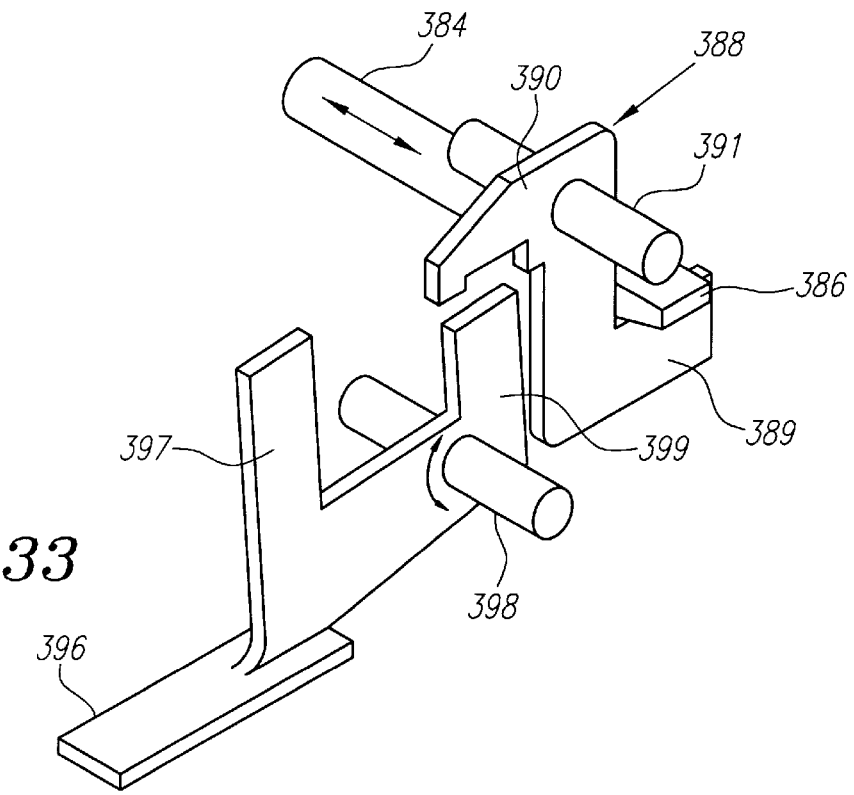
FIG. 33 is a fragmentary side view of the engagement and eject mechanism of FIGS. 31 and 32, showing the eject button and disengagement arrangement.

To engage and disengage the disk 308 in the cartridge 300, while permitting ready loading and ejection of the cartridge, an eject button 382 is accessible from the first base leg 330 when it is extended beyond the enclosure 315. The eject button 382 includes a shaft extending inwardly and transversely past the pivot base 352 and the hinge 362. A load cam 386 (FIGS. 31 and 32) at the end of the shaft 384 rides against a first arm 389 of an engage toggle 388 to shift a second arm 390 in the counterclockwise direction about a pin 391, so as to effect engagement of the drive hub 364. A release control element 394 having an angled hub engage finger 396 acts as a lifter on the side tab 368 on the rotary arm 360. Concurrently, a substantially perpendicularly disposed eject finger 397 is turned with the hub engaged finger 396 about a pivot pin 398. A stub end 399 of the release control element 394 is then engaged by the second arm 390 of the engage toggle 388 to turn in the clockwise direction so as to effect engagement when the distal end of the cartridge 300 engages the eject finger 397. The stub end 399 is locked in place by the second arm 390, as the drive hub 364 is raised into position via the side tab 368 engagement.

Figure 24:
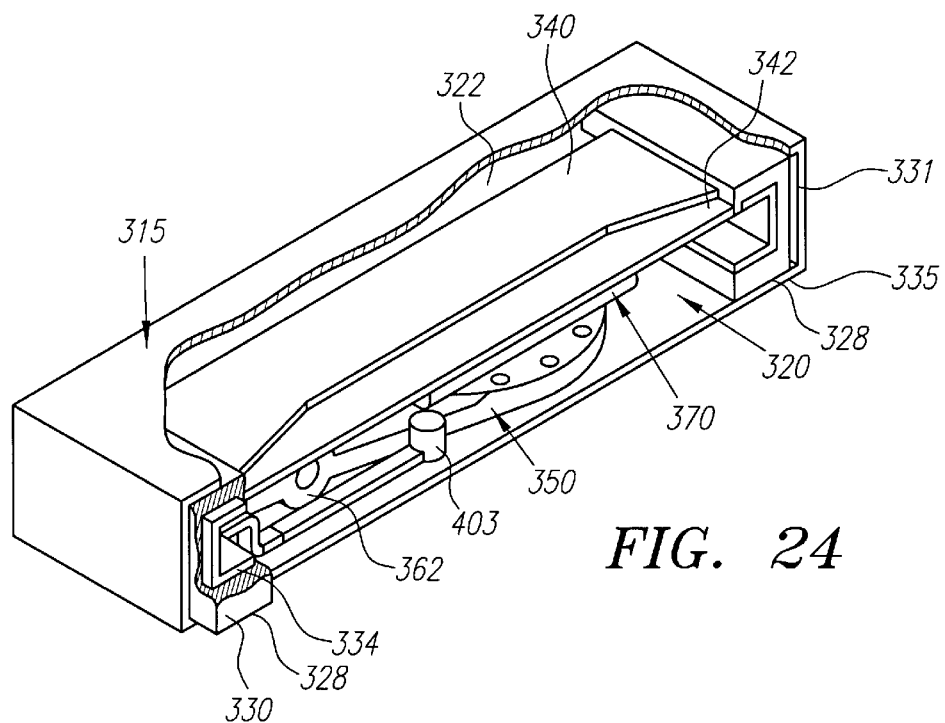
FIG. 24 is a perspective view, partially broken away, of the assembly of FIG. 23, in nested position.

Deployment—From the nested position, depicted in FIGS. 24 and 25, the mechanism is deployed, against any detents or locking latches that hold the mechanism in nested but releasable position, by manually extending the outer cross arm 342. This pulls the outer side legs 334, 335 and then the base legs 330, 331 together with the base cross arm 340, outwardly in the proximal direction. As this transpires, the eject button 382 and the engage release mechanisms for the cartridge are also drawn out into the position shown in FIG. 27, beyond the proximal open edge of the enclosure 315. Concurrently, the positioning finger 378 on the base cross arm 340 rotates the transducer mechanism body 372 clockwise to the fully deployed position, in alignment with the axis of a disk cartridge to be inserted. The drive hub engagement mechanism is brought in the position shown in FIGS. 27, 28 and 31, with the drive hub 364 hinged to an entry position below the plane of insertion of the cartridge 300, providing adequate clearance for entry. The door opener arm 354 moves out with the base leg 331 to the deployed position Loading—A cartridge 300 is inserted between the grooves of the outer legs 334, 335 of the side guides 325, 326, until the access door 307 at its distal end is engaged by the free end of the spring tension door opener arm 354, which is in line with the edge of the door 307. The arm 354 is a light spring which bends when engaging the side of the door 307, sliding it open to free the access opening 306 for entry of the transducer heads 380. As the distal end of the cartridge 300 reaches the engage mechanism of FIGS. 31 and 32, it contacts the eject finger 397, rotating the release control element 394 clockwise, and the hub engage finger 396 forces the side tab up, and the drive hub 364 into engagement with the center drive hub 310 of the cartridge 300. The stub end 399 is also locked into place in the second arm 390.

Data Transfer Operations—Thereafter, data transduction operations take place in conventional fashion for the ZIP drive cartridge 300. The drive hub 364 rotates the interior disk in the cartridge at the selected rotational velocity, and the transducer heads 380 are shifted from track to track until all data transfer operations are completed for that cartridge.

Disengagement and Release—If it is only desired to exchange one cartridge 300 for another, the side eject button 382 is pressed inwardly, and the load cam 386 engages the first arm 389 of the engage toggle 388, forcing it clockwise about the pivot pin 391, and causing the release control element 394 to turn counterclockwise forcing the cartridge in the proximal or release direction, at the same time that the drive hub 364 is hinged downwardly out of engagement. The mechanism then awaits entry of a new cartridge 300.

Return to Nesting Position—With the cartridge removed, the operator simply can move the outer cross arm 342 inwardly, telescoping the outer legs 333, 334 into the base legs 330, 331, and then collapsing both the base legs 330, 331 and outer legs 334, 335 into the retainer grooves 328. As this is done, the pivot pin 354 in the pivot base 352 as well as the knife action spring 356 move the arm 360 and drive hub 364 in the distal direction, with the first base leg 330. At the same time a pin 403 extending from the first outer leg 334 below the cartridge plane engages the rotary arm 360, pivoting it counter-clockwise back toward the nested position. The rotary arm 360 and drive hub 364 are in the plane immediately below the transducer mechanism 370, which concurrently is released by the positioning finger 378 moving along the contoured side wall 376. The spring bias at the point 374 allows the transducer mechanism 370 to return counterclockwise to the nested position (FIG. 25). Automatically operable detents, a stop or a manually positionable latch can be used to secure the transducer mechanism 370 in the nested position.

Figure 36:
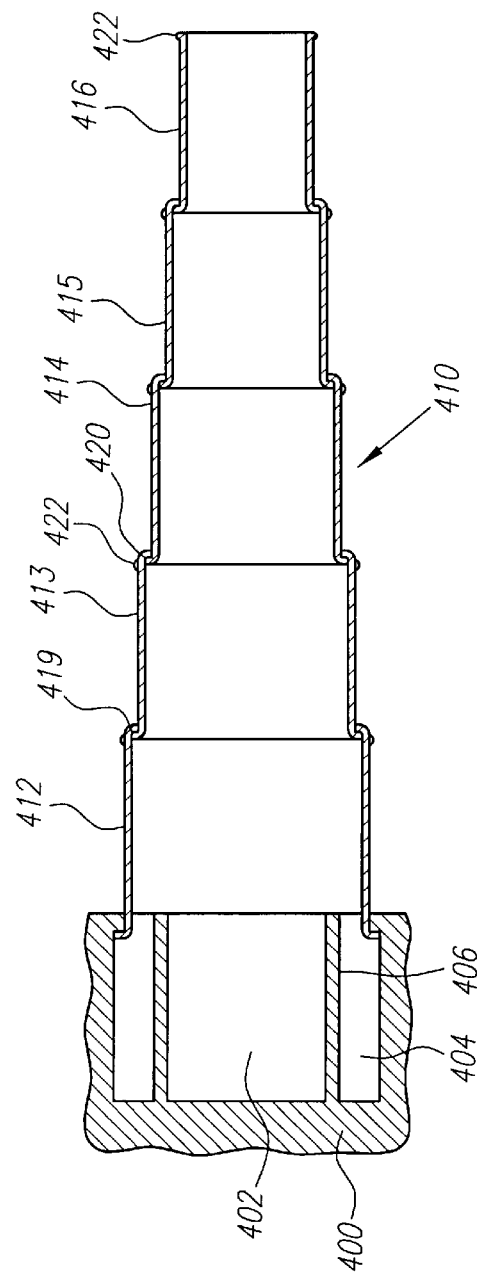
FIG. 36 is a side sectional view of the deployed cover mechanism showing further details thereof.
Figure 34:
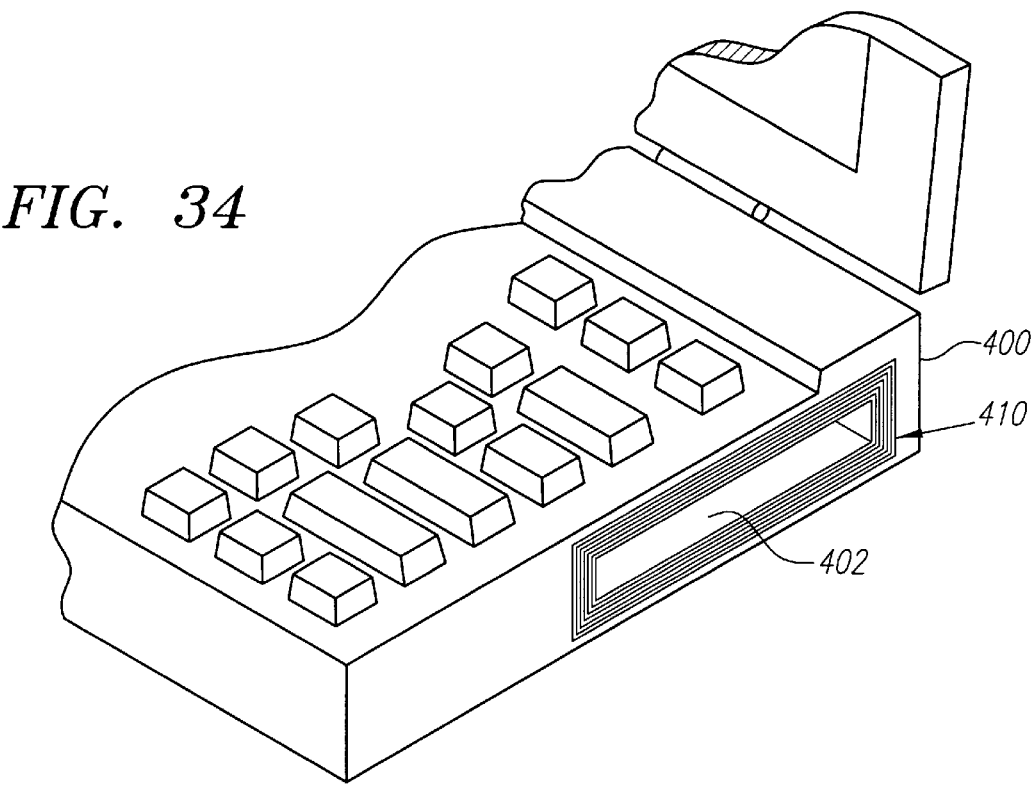
FIG. 34 is a perspective view of an example of a deployable cover mechanism, in a nested position, that may be extended to protect the media and deployable components.
Figure 35:
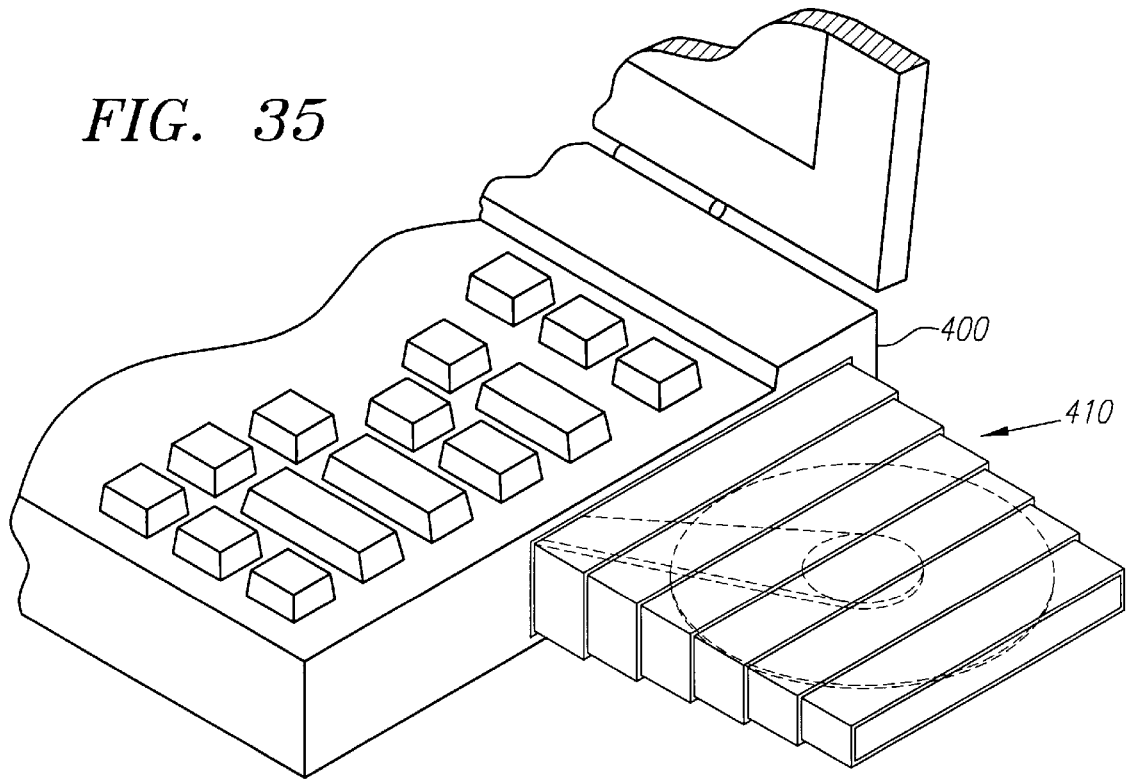
FIG. 35 is a perspective view corresponding to FIG. 34 showing the cover mechanism in deployed position with a rotatable media in dotted lines.

Protection of the deployed media and drive mechanism is readily feasible, as shown by the deployable cover example of FIGS. 34–36. A deployable cover may be used to guard any of the different deployable versions shown, as well as others since the cover mechanism need only fit with available space about or at the periphery of the enclosure. In this example, the drive and media are shown only in generalized form. A laptop computer 400 has a side mounted, shallow depth drive mechanism enclosure 402 and a shallow depth encompassing cover enclosure 404 which for convenience are shown separated by walls 406, although the drive enclosure volume need not be confined in this manner.

The deployable cover 410, shown in nested position in FIG. 34, comprises a series of telescoping segments 412–416, each of thin sheet material forming a rectangular box fitting within the cover enclosure 404. Lips, such as the outwardly turned lip 419 at the inner edge of the frame 413 and the inwardly turned lip at 420 at the outer edge of the frame 413 provide sliding contact engagement with the associated frames 412, 414 respectively, to permit the telescoping action. Projections 422 on the outside of the frames 413–416 engage the lip at the outer side of the adjacent larger frame, to prevent oversliding in the collapsing direction. Consequently, the telescoping cover 410 fits fully within the cover enclosure 404, leaving open the interior deployable drive enclosure 402, as best seen in FIG. 34. When extended, the cover 410 fully protects an internal media, shown in dotted line position as deployed. If desired, a hinged or other end plate (not shown) may be used at the outermost frame 416, although frame may also be constructed with a bifurcated easily opened and readily closed end cover, if desired.

Accordingly, any danger perceived by a user or manufacturer as to the possibility of the impact of external forces on the media or the drive are obviated by the protective cover, which can be of adequate strength, even though constructive thin industrial plastic sheet metal.

Among other suitable deployable covers that will suggest themselves to those skilled in the art are nestable structures that fan out from a pivot axis of one side of the drive enclosure, framework assemblies that are collapsible into a compact hollow shape, and peripheral structures that slide out and beyond telescoping arms. These may be employed with any of the deployable units in accordance with the invention, given expectable accommodations for size and form factor.

Although there have been described above and illustrated in the drawings various forms and modifications in accordance with the invention, it will be appreciated that the invention is not limited thereto but encompasses all modifications and examples within the scope of the appended claims.

What is claimed is:

1. A system for signal transduction using a rotatable data storage media that is rotatable about a central drive axis and has a given radius, the system comprising:
    a housing having a lateral dimension greater than the media diameter and a depth less than the media radius;
    a deployable retainer that is movable from a nested position to a deployed position, the retainer in the nested position being located within the housing and the retainer in the deployed position protruding from the interior of the housing to the exterior of the housing for retaining the media in an operative position such that the media is located partially inside the housing and principally outside the housing;
    a deployable media drive including a terminal media drive, the deployable media drive being movable between a nested position and a deployed position such that when the deployable media drive is in the nested position, the deployable media drive and terminal media drive are located within the housing where the terminal media drive cannot engage the media center, and when the deployable media drive is in the deployed position, the deploy able media drive protrudes from the interior of the housing to the outside of the housing and the terminal media drive is located outside the housing and is engageable with the media center to rotate the media without requiring full insertion of the media into the housing; and
    a deployable transducer mechanism operable between a nested position and a transducing position, the deployable transducer mechanism in the nested position being located within the housing and the deployable transducer mechanism in the transducing position being able to transduce signals to or from the media in the operative position such that signal transduction operations are carried out without requiring full insertion of the media into the housing.

2. The system as set forth in claim 1 above, wherein the deployable media drive comprises a deployable rotatable drive to engage one side of the media and a hub to engage the opposite side of the media, and wherein the deployable transducer mechanism extends at an angle toward the media center in the operative position from one side of the housing.

3. The system as set forth in claim 1 above, further including a return mechanism that returns the deployable media drive and the deployable transducer mechanism to their respective nested positions upon removal of the media and wherein the housing is dimensioned to partially receive only a single media at a time.

4. The system as set forth in claim 1 above, wherein the media has a drive axis and the retainer holds the media in the operative position centered about the drive axis with less than half of the media located in the interior of the housing.

5. The system as set forth in claim 4 above, wherein the retainer comprises a clamp to engage one side of the central region of the media and a drive to engage the other side of the central region of the media.

6. The system as set forth in claim 1 above, the system further comprising a cover for the media, the cover being attachable to the housing and encompassing the portions of an inserted media that are outside the housing when the media is in the operative position.

7. A device for reading data from or writing data to a rotatable media, the media having a radius extending from its drive axis, the area of the device being smaller than one-half the area of the media, the device comprising:
    a housing which accommodates less than half of the media when the media is inserted;
    a deployable media engagement device for retaining the media in an operative position such that the drive axis of the media is located exterior of the housing;
    a deployable drive mechanism movable from the interior of the housing to the exterior of the housing;
    a drive mounted to the deployable drive mechanism so that the deployable drive mechanism moves the drive from the interior of the housing to the exterior of the housing, where the drive when located exterior of the housing can engage the central region of the media for rotating the media without requiring the full insertion of the media into the housing;

a deployable transducer mechanism movable from the interior of the housing to the exterior of the housing;

a transducer mounted to the deployable transducer mechanism so that the deployable transducer mechanism moves the transducer from the interior of the housing to the exterior of the housing, the transducer when exterior of the housing movable along the radius of the media;

wherein the drive and the transducer when located in the interior of the housing are positioned to nest without interference within the housing.

8. A device as set forth in claim 7 above, wherein the deployable drive mechanism and the deployable transducer mechanism deploy the drive and the transducer respectively in planes substantially parallel to the operative plane of the media.

9. A drive mechanism for a single rotatable data media having a central single drive axis and being of the type removable from and interchangeable in a drive mechanism, the drive mechanism comprising:

a component enclosure having a height greater than the media height, a lateral dimension at least substantially equal to the lateral dimension of the media and a depth substantially less than the lateral dimension of the media;

a first deployable mechanism extendible from a nested position wholly within the enclosure to a deployed position such that the first deployable mechanism is substantially outside the enclosure to retain the media in an operative position;

a second deployable mechanism nesting completely in the enclosure when in a packed position and when in a deployed position engageable to the central region of the retained media for rotating the media at its central axis, the central region being outside the enclosure; and a third deployable mechanism nesting completely within the enclosure when in a packed position and when in a deployed position in operative engagement with the media, the third deployable mechanism including a positioner that radially positions the third deployable mechanism relative to the media, whereby the media can be operated without requiring the media to be substantially located inside the enclosure.

10. A drive and transducing system for a removable disk media comprising:

a housing having a volume into which less than half of the media can fit;

a drive for engaging the removable disk media;

a deployable drive mechanism coupled to the drive for moving the drive between a packed position within the housing volume and a deployed position outside the housing volume where the drive mechanism may rotate the media without requiring the full insertion of the media into the housing;

a transducer for reading or writing data on the removable disk media;

a deployable transducer mechanism coupled to the transducer for moving the transducer between a packed position within the housing volume and a deployed position outside the housing volume and for positioning the transducer relative to the media, the drive and transducer mechanisms being adjacent and along a common first plane in the packed position within the housing volume, and lying at least partially transverse to a common second plane substantially perpendicular to the first plane when deployed.

11. A drive system for rotatable data storage media comprising:

a base having a depth less than a dimension of the media, a length and a height the base defining an interior volume;

a media drive device mounted adjacent one end of the length or the base within the interior volume and extendible along a given plane substantially perpendicular to the base length outside the interior volume;

a transducer mechanism mounted adjacent the other end of the length of the base within the interior volume and extendible along the given plane outside the interior volume; and a receiver coupled to the base for receiving a rotatable media along the given plane such that the media protrudes from the interior volume of the base past the extended media drive device and the extended transducer mechanism where the media drive device may rotate the media while the media protrudes from the interior volume or the base.

12. A compact structure for cooperating with a separately installable and removable disk storage media, the compact structure comprising:

a base unit having an outer envelope smaller than the area envelope of the media to be operated;

a rotatable drive for rotating the media, the rotatable drive including a first deployable mechanism mounted in the base unit for nesting the drive substantially within the base unit and for deploying the drive to an operating position outside the base unit and into engagement with an installed media which is only partially within the base unit when the media is in an operative position for being rotated;

a transducer including a second deployable mechanism for moving the transducer between a nested position at least partially within the base unit and an operative position outside the base unit such that the transducer is in scanning relationship to the media in the operative position; and a positioner engageable to the transducer for controlling the location of the transducer relative to the media during operation.

13. The compact structure as set forth in claim 12 above, wherein the drive includes a terminal mechanism to engage a central region of the media for rotation of the media.

14. The compact structure as set forth in claim 13 above, wherein the base unit includes a receiver that receives a portion of the media, and wherein the area of the base unit formed by the depth and length of the base unit is less than half of the area of the media, such that the media protrudes substantially from the base unit when the media is installed.

15. A drive and transducer system for a rotatable, removable media having edge positions and a center region, the system comprising:

a base for receiving an edge portion of the media, the base having a depth dimension less than the depth dimension of the media such that the center region of the received media extends beyond the base;

a deployable drive mechanism extendible from the base to engage the center region of the received media for rotating the media while the center region of the received media extends beyond the base;

a deployable transducer mechanism extendible from the base to access a selected region of the media; and a positioning mechanism that controls the access position of the transducer with respect to the media.

16. A method of using a rotatable data storage media employing a drive device and transducer mechanism, the method comprising the steps of:
 receiving the media in a protruding position relative to the drive device and the transducer mechanism such that the central region of the media is spaced apart from the drive device and the transducer mechanism;
 deploying the drive device toward the central region of the media to grip the central region of the media when the media is in the protruding position;
 rotating the media white the media in the protruding position;
 deploying a transducer mechanism into operative relation with respect to the media when the media is in the protruding position; and
 controlling the operative position of the transducer mechanism relative to the media to effect data transfer with the media when the media is in the protruding position.

17. A deployable device for reading tracks on a disk substantially larger than the space in which the device is mounted in the housing of a data processor assembly, the device comprising:
 means defining a shallow depth elongated chamber along and within a wall of the housing;
 drive means pivotably mounted adjacent one longitudinal end of the elongated chamber;
 means for deploying the drive means outwardly from the chamber about the pivot;
 a drive hub in the drive means for receiving and rotating the disk when the drive means is deployed outwarded from the chamber;
 transducing means mounted in a second longitudinal end of the chamber and extending outwardly therefrom, the transducing means being movable along a transverse path relative to the deployed drive hub;
 means at the drive hub for releasably securing a disk in an operative position; and
 means coupled to the transducing means for changing the position of the transducing means such that the transducing means reproduces signals from different tracks.

18. The system for signal transduction as set forth in claim 1 where the rotatable data storage media is a floppy disk.

19. The system for signal transduction as set forth in claim 1 where the rotatable data storage media is a CD ROM disk.

20. The system for signal transduction as set forth in claim 4 where the rotatable data storage media is a floppy disk.

21. The system for signal transduction as set forth in claim 4 where the rotatable data storage media is a CD ROM disk.

22. The device as set forth in claim 7 where the media is a floppy disk.

23. The device as set forth in claim 7 where the media is a CD ROM disk.

24. The drive mechanism as set forth in claim 9 where the rotatable data media is a floppy disk.

25. The drive mechanism as set forth in claim 9 where the rotatable data media is a CD ROM disk.

26. The drive and transducing system as set forth in claim 10 where the removable disk media is a floppy disk.

27. The drive and transducing system as set forth in claim 10 where the removable disk media is a CD ROM disk.

28. The drive system as set forth in claim 11 where the rotatable data storage media is a floppy disk.

29. The drive system as set forth in claim 11 where the rotatable data storage media is a CD ROM disk.

30. The compact structure as set forth in claim 12 where the removable disk storage media is a floppy disk.

31. The compact structure as set forth in claim 12 where the removable disk storage media is a CD ROM disk.

32. The drive and transducer system as set forth in claim 15 where the media is a floppy disk.

33. The drive and transducer system as set forth in claim 15 where the media is a CD ROM disk.

34. The method as set forth in claim 16 where the rotatable data storage media is a floppy disk.

35. The method as set forth in claim 16 where the rotatable data storage media is a CD ROM disk.

36. The deployable device as set forth in claim 17 where the disk is a floppy disk.

37. The deployable device as set forth in claim 17 where the disk is a CD ROM disk.

* * * * *